US010931550B2

(12) United States Patent
Kumar et al.

(10) Patent No.: US 10,931,550 B2
(45) Date of Patent: Feb. 23, 2021

(54) OUT-OF-BAND MANAGEMENT TECHNIQUES FOR NETWORKING FABRICS

(71) Applicant: Intel Corporation, Santa Clara, CA (US)

(72) Inventors: Mohan J. Kumar, Aloha, OR (US); Murugasamy J. Nachimuthu, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 389 days.

(21) Appl. No.: 15/656,830

(22) Filed: Jul. 21, 2017

(65) Prior Publication Data

US 2018/0026918 A1 Jan. 25, 2018

Related U.S. Application Data

(60) Provisional application No. 62/427,268, filed on Nov. 29, 2016, provisional application No. 62/376,859, (Continued)

(51) Int. Cl.
H04L 12/26 (2006.01)
G06F 16/901 (2019.01)
(Continued)

(52) U.S. Cl.
CPC ............ *H04L 43/08* (2013.01); *G02B 6/3882* (2013.01); *G02B 6/3893* (2013.01); *G02B 6/3897* (2013.01); *G02B 6/4292* (2013.01); *G02B 6/4452* (2013.01); *G06F 1/183* (2013.01); *G06F 1/20* (2013.01); *G06F 3/064* (2013.01); *G06F 3/0613* (2013.01); *G06F 3/0625* (2013.01); *G06F 3/0653* (2013.01); *G06F 3/0655* (2013.01); *G06F 3/0664* (2013.01); *G06F 3/0665* (2013.01); *G06F 3/0673* (2013.01); *G06F 3/0679* (2013.01); *G06F 3/0683* (2013.01); *G06F 3/0688* (2013.01); *G06F 3/0689* (2013.01); *G06F 8/65* (2013.01); *G06F 9/30036* (2013.01); *G06F 9/4401* (2013.01);
(Continued)

(58) Field of Classification Search
None
See application file for complete search history.

(56) References Cited

U.S. PATENT DOCUMENTS 5,642,349 A * 6/1997 Cloonan ............. H04L 12/5601
370/360
5,838,683 A * 11/1998 Corley ................... H04L 29/06
370/408
(Continued)

*Primary Examiner* — Ayaz R Sheikh
*Assistant Examiner* — Faiyazkhan Ghafoerkhan
(74) *Attorney, Agent, or Firm* — Compass IP Law PC

(57) ABSTRACT

Out-of-band management techniques for networking fabrics are described. In an example embodiment, an apparatus may comprise a packet-switched network interface to deconstruct a packet received via an out-of-band management network and control circuitry to execute an out-of-band management agent, and the out-of-band management agent may be operative to identify a configuration command comprised in the received packet and control an optical circuit-switched network interface based on the configuration command. Other embodiments are described and claimed.

15 Claims, 23 Drawing Sheets

Related U.S. Application Data filed on Aug. 18, 2016, provisional application No. 62/365,969, filed on Jul. 22, 2016.

(51) Int. Cl.

| | | |
|---|---|---|
| *H04B 10/25* | (2013.01) |
| *G02B 6/38* | (2006.01) |
| *G02B 6/42* | (2006.01) |
| *G02B 6/44* | (2006.01) |
| *G06F 1/18* | (2006.01) |
| *G06F 1/20* | (2006.01) |
| *G06F 3/06* | (2006.01) |
| *G06F 8/65* | (2018.01) |
| *G06F 9/30* | (2018.01) |
| *G06F 9/4401* | (2018.01) |
| *G06F 9/54* | (2006.01) |
| *G06F 12/109* | (2016.01) |
| *G06F 12/14* | (2006.01) |
| *G06F 13/16* | (2006.01) |
| *G06F 13/40* | (2006.01) |
| *G08C 17/02* | (2006.01) |
| *G11C 5/02* | (2006.01) |
| *G11C 7/10* | (2006.01) |
| *G11C 11/56* | (2006.01) |
| *G11C 14/00* | (2006.01) |
| *H03M 7/30* | (2006.01) |
| *H03M 7/40* | (2006.01) |
| *H04L 12/24* | (2006.01) |
| *H04L 12/931* | (2013.01) |
| *H04L 12/947* | (2013.01) |
| *H04L 29/08* | (2006.01) |
| *H04L 29/06* | (2006.01) |
| *H04Q 11/00* | (2006.01) |
| *H05K 7/14* | (2006.01) |
| *G06F 9/38* | (2018.01) |
| *G06F 9/50* | (2006.01) |
| *H04L 12/851* | (2013.01) |
| *H04L 12/811* | (2013.01) |
| *H05K 5/02* | (2006.01) |
| *H04W 4/80* | (2018.01) |
| *G06Q 10/08* | (2012.01) |
| *G06Q 10/00* | (2012.01) |
| *G06Q 50/04* | (2012.01) |
| *H04L 12/911* | (2013.01) |
| *B25J 15/00* | (2006.01) |
| *B65G 1/04* | (2006.01) |
| *H05K 7/20* | (2006.01) |
| *H04L 12/939* | (2013.01) |
| *H04W 4/02* | (2018.01) |
| *H04L 12/751* | (2013.01) |
| *G06F 13/42* | (2006.01) |
| *H05K 1/18* | (2006.01) |
| *G05D 23/19* | (2006.01) |
| *G05D 23/20* | (2006.01) |
| *H04L 12/927* | (2013.01) |
| *H05K 1/02* | (2006.01) |
| *H04L 12/781* | (2013.01) |
| *H04Q 1/04* | (2006.01) |
| *G06F 12/0893* | (2016.01) |
| *H05K 13/04* | (2006.01) |
| *G11C 5/06* | (2006.01) |
| *G06F 11/14* | (2006.01) |
| *G06F 11/34* | (2006.01) |
| *G06F 12/0862* | (2016.01) |
| *G06F 15/80* | (2006.01) |
| *H04L 12/919* | (2013.01) |
| *G06F 12/10* | (2016.01) |
| *G06Q 10/06* | (2012.01) |
| *G07C 5/00* | (2006.01) |
| *H04L 12/28* | (2006.01) |
| *H04L 29/12* | (2006.01) |
| *H04L 9/06* | (2006.01) |
| *H04L 9/14* | (2006.01) |
| *H04L 9/32* | (2006.01) |
| *H04L 12/933* | (2013.01) |

(52) U.S. Cl.
CPC ............ *G06F 9/544* (2013.01); *G06F 12/109* (2013.01); *G06F 12/1408* (2013.01); *G06F 13/1668* (2013.01); *G06F 13/409* (2013.01); *G06F 13/4068* (2013.01); *G06F 16/9014* (2019.01); *G08C 17/02* (2013.01); *G11C 5/02* (2013.01); *G11C 7/1072* (2013.01); *G11C 11/56* (2013.01); *G11C 14/0009* (2013.01); *H03M 7/3086* (2013.01); *H03M 7/4056* (2013.01); *H03M 7/4081* (2013.01); *H04B 10/25891* (2020.05); *H04L 41/145* (2013.01); *H04L 43/0817* (2013.01); *H04L 43/0876* (2013.01); *H04L 43/0894* (2013.01); *H04L 49/00* (2013.01); *H04L 49/25* (2013.01); *H04L 49/357* (2013.01); *H04L 49/45* (2013.01); *H04L 67/02* (2013.01); *H04L 67/306* (2013.01); *H04L 69/04* (2013.01); *H04L 69/329* (2013.01); *H04Q 11/0003* (2013.01); *H05K 7/1442* (2013.01); *B25J 15/0014* (2013.01); *B65G 1/0492* (2013.01); *G05D 23/1921* (2013.01); *G05D 23/2039* (2013.01); *G06F 3/061* (2013.01); *G06F 3/067* (2013.01); *G06F 3/0611* (2013.01); *G06F 3/0616* (2013.01); *G06F 3/0619* (2013.01); *G06F 3/0631* (2013.01); *G06F 3/0638* (2013.01); *G06F 3/0647* (2013.01); *G06F 3/0658* (2013.01); *G06F 3/0659* (2013.01); *G06F 9/3887* (2013.01); *G06F 9/505* (2013.01); *G06F 9/5016* (2013.01); *G06F 9/5044* (2013.01); *G06F 9/5072* (2013.01); *G06F 9/5077* (2013.01); *G06F 11/141* (2013.01); *G06F 11/3414* (2013.01); *G06F 12/0862* (2013.01); *G06F 12/0893* (2013.01); *G06F 12/10* (2013.01); *G06F 13/161* (2013.01); *G06F 13/1694* (2013.01); *G06F 13/4022* (2013.01); *G06F 13/42* (2013.01); *G06F 13/4282* (2013.01); *G06F 15/8061* (2013.01); *G06F 2209/5019* (2013.01); *G06F 2209/5022* (2013.01); *G06F 2212/1008* (2013.01); *G06F 2212/1024* (2013.01); *G06F 2212/1041* (2013.01); *G06F 2212/1044* (2013.01); *G06F 2212/152* (2013.01); *G06F 2212/202* (2013.01); *G06F 2212/401* (2013.01); *G06F 2212/402* (2013.01); *G06F 2212/7207* (2013.01); *G06Q 10/06* (2013.01); *G06Q 10/06314* (2013.01); *G06Q 10/087* (2013.01); *G06Q 10/20* (2013.01); *G06Q 50/04* (2013.01); *G07C 5/008* (2013.01); *G08C 2200/00* (2013.01); *G11C 5/06* (2013.01); *H03M 7/30* (2013.01); *H03M 7/3084* (2013.01); *H03M 7/40* (2013.01); *H03M 7/4031* (2013.01); *H03M 7/6005* (2013.01); *H03M 7/6023* (2013.01); *H04B 10/25* (2013.01); *H04L 9/0643* (2013.01); *H04L 9/14* (2013.01); *H04L 9/3247* (2013.01);

H04L 9/3263 (2013.01); H04L 12/2809 (2013.01); H04L 29/12009 (2013.01); H04L 41/024 (2013.01); H04L 41/046 (2013.01); H04L 41/082 (2013.01); H04L 41/0813 (2013.01); H04L 41/0896 (2013.01); H04L 41/12 (2013.01); H04L 41/147 (2013.01); H04L 41/5019 (2013.01); H04L 43/065 (2013.01); H04L 43/16 (2013.01); H04L 45/02 (2013.01); H04L 45/52 (2013.01); H04L 47/24 (2013.01); H04L 47/38 (2013.01); H04L 47/765 (2013.01); H04L 47/782 (2013.01); H04L 47/805 (2013.01); H04L 47/82 (2013.01); H04L 47/823 (2013.01); H04L 49/15 (2013.01); H04L 49/555 (2013.01); H04L 67/10 (2013.01); H04L 67/1004 (2013.01); H04L 67/1008 (2013.01); H04L 67/1012 (2013.01); H04L 67/1014 (2013.01); H04L 67/1029 (2013.01); H04L 67/1034 (2013.01); H04L 67/1097 (2013.01); H04L 67/12 (2013.01); H04L 67/16 (2013.01); H04L 67/34 (2013.01); H04Q 1/04 (2013.01); H04Q 11/00 (2013.01); H04Q 11/0005 (2013.01); H04Q 11/0062 (2013.01); H04Q 11/0071 (2013.01); H04Q 2011/0037 (2013.01); H04Q 2011/0041 (2013.01); H04Q 2011/0052 (2013.01); H04Q 2011/0073 (2013.01); H04Q 2011/0079 (2013.01); H04Q 2011/0086 (2013.01); H04Q 2213/13523 (2013.01); H04Q 2213/13527 (2013.01); H04W 4/023 (2013.01); H04W 4/80 (2018.02); H05K 1/0203 (2013.01); H05K 1/181 (2013.01); H05K 5/0204 (2013.01); H05K 7/1418 (2013.01); H05K 7/1421 (2013.01); H05K 7/1422 (2013.01); H05K 7/1447 (2013.01); H05K 7/1461 (2013.01); H05K 7/1485 (2013.01); H05K 7/1487 (2013.01); H05K 7/1489 (2013.01); H05K 7/1491 (2013.01); H05K 7/1492 (2013.01); H05K 7/1498 (2013.01); H05K 7/2039 (2013.01); H05K 7/20709 (2013.01); H05K 7/20727 (2013.01); H05K 7/20736 (2013.01); H05K 7/20745 (2013.01); H05K 7/20836 (2013.01); H05K 13/0486 (2013.01); H05K 2201/066 (2013.01); H05K 2201/10121 (2013.01); H05K 2201/10159 (2013.01); H05K 2201/10189 (2013.01); Y02D 10/00 (2018.01); Y02P 90/30 (2015.11); Y04S 10/50 (2013.01); Y04S 10/52 (2013.01); Y10S 901/01 (2013.01)

(56) References Cited

U.S. PATENT DOCUMENTS

| | | | | |
|---|---|---|---|---|
| 6,137,793 | A * | 10/2000 | Gorman | H04H 60/97 348/E7.07 |
| 6,304,576 | B1 * | 10/2001 | Corley | H04L 29/06 370/408 |
| 7,522,614 | B1 * | 4/2009 | Aguinaga | H04L 12/46 370/401 |
| 2003/0023709 | A1 * | 1/2003 | Alvarez | H04J 14/0291 709/223 |
| 2003/0108030 | A1 * | 6/2003 | Gao | H04L 29/06027 370/351 |
| 2003/0163555 | A1 * | 8/2003 | Battou | H04J 14/0294 709/223 |
| 2003/0200548 | A1 * | 10/2003 | Baran | H04N 21/2365 725/90 |
| 2005/0002388 | A1 * | 1/2005 | Gao | H04L 29/06027 370/389 |
| 2005/0002405 | A1 * | 1/2005 | Gao | G06F 13/102 370/401 |
| 2006/0013149 | A1 * | 1/2006 | Jahn | H04J 14/02 370/254 |
| 2009/0271834 | A1 * | 10/2009 | Asmussen | H04N 21/4782 725/106 |
| 2011/0040917 | A1 * | 2/2011 | Lambert | H04L 69/14 710/301 |
| 2012/0227075 | A1 * | 9/2012 | Asmussen | H04N 7/17318 725/106 |
| 2014/0010113 | A1 * | 1/2014 | Diab | H04L 45/24 370/254 |
| 2014/0173338 | A1 * | 6/2014 | Arroyo | G06F 11/1438 714/15 |
| 2015/0082063 | A1 * | 3/2015 | Peterson | G06F 3/0689 713/323 |
| 2015/0106660 | A1 * | 4/2015 | Chumbalkar | G06F 11/328 714/42 |
| 2015/0179378 | A1 * | 6/2015 | Bannon | H01H 59/0009 307/115 |
| 2016/0085451 | A1 * | 3/2016 | Lee-Baron | G06F 3/0619 711/113 |
| 2016/0227300 | A1 * | 8/2016 | Lai | H04B 10/70 |
| 2017/0018149 | A1 * | 1/2017 | Shih | H05B 45/00 |
| 2017/0046152 | A1 * | 2/2017 | Shih | G06F 11/1433 |
| 2017/0180477 | A1 * | 6/2017 | Hashimoto | G06F 12/0246 |
| 2017/0180478 | A1 * | 6/2017 | Hashimoto | G06F 12/0246 |
| 2018/0176668 | A1 * | 6/2018 | Froc | H04Q 11/0067 |

* cited by examiner

Data Center 100

US 10,931,550 B2

OUT-OF-BAND MANAGEMENT TECHNIQUES FOR NETWORKING FABRICS

RELATED CASE

This application claims priority to U.S. Provisional Patent Application No. 62/365,969, filed Jul. 22, 2016, U.S. Provisional Patent Application No. 62/376,859, filed Aug. 18, 2016, and U.S. Provisional Patent Application No. 62/427,268, filed Nov. 29, 2016, each of which is hereby incorporated by reference in its entirety.

BACKGROUND

In a contemporary data center, a network fabric may generally provide communicative connectivity among a large number of compute nodes, which may be distributed among numerous data center racks. In order to enable high-speed data communications among compute nodes of such a data center, it may be desirable to implement a high-performance computing (HPC) fabric, such as an optical circuit-switched fabric. In order to support HPC data communications on the part of a given compute node, it may be necessary to configure a host fabric interface via which the compute node accesses the HPC fabric.

DETAILED DESCRIPTION

Various embodiments may be generally directed to out-of-band management techniques for networking fabrics. In one embodiment, for example, an apparatus may comprise a packet-switched network interface to deconstruct a packet received via an out-of-band management network and control circuitry to execute an out-of-band management agent, and the out-of-band management agent may be operative to identify a configuration command comprised in the received packet and control an optical circuit-switched network interface based on the configuration command. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
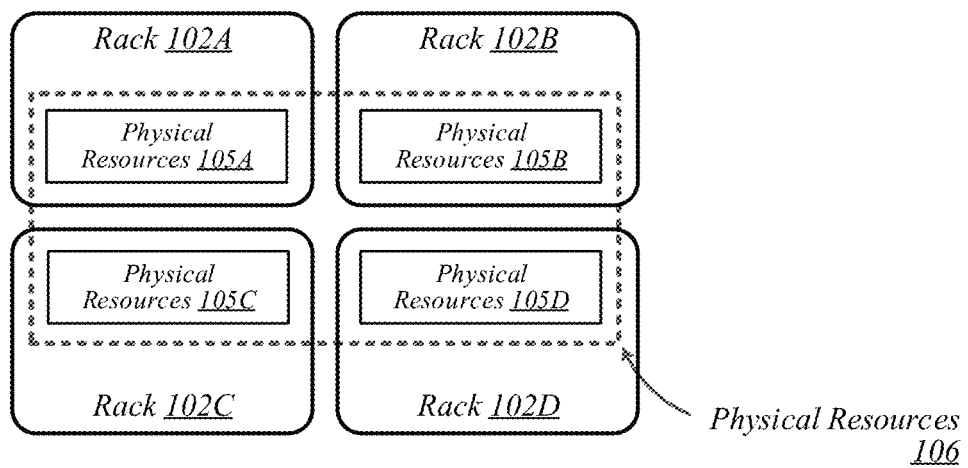
FIG. 1 illustrates an embodiment of a first data center.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twister pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

Figure 2:
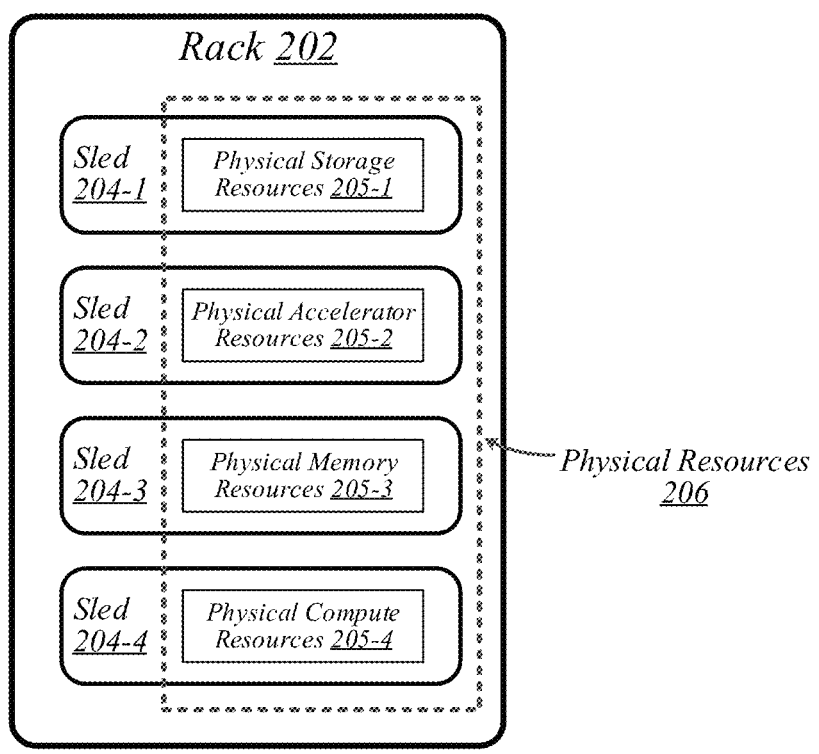
FIG. 2 illustrates an embodiment of a logical configuration of a rack.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies. FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulable sleds comprising disaggregated resources, each type of resource can be upgraded independently of each other and at their own optimized refresh rate.

Figure 3:
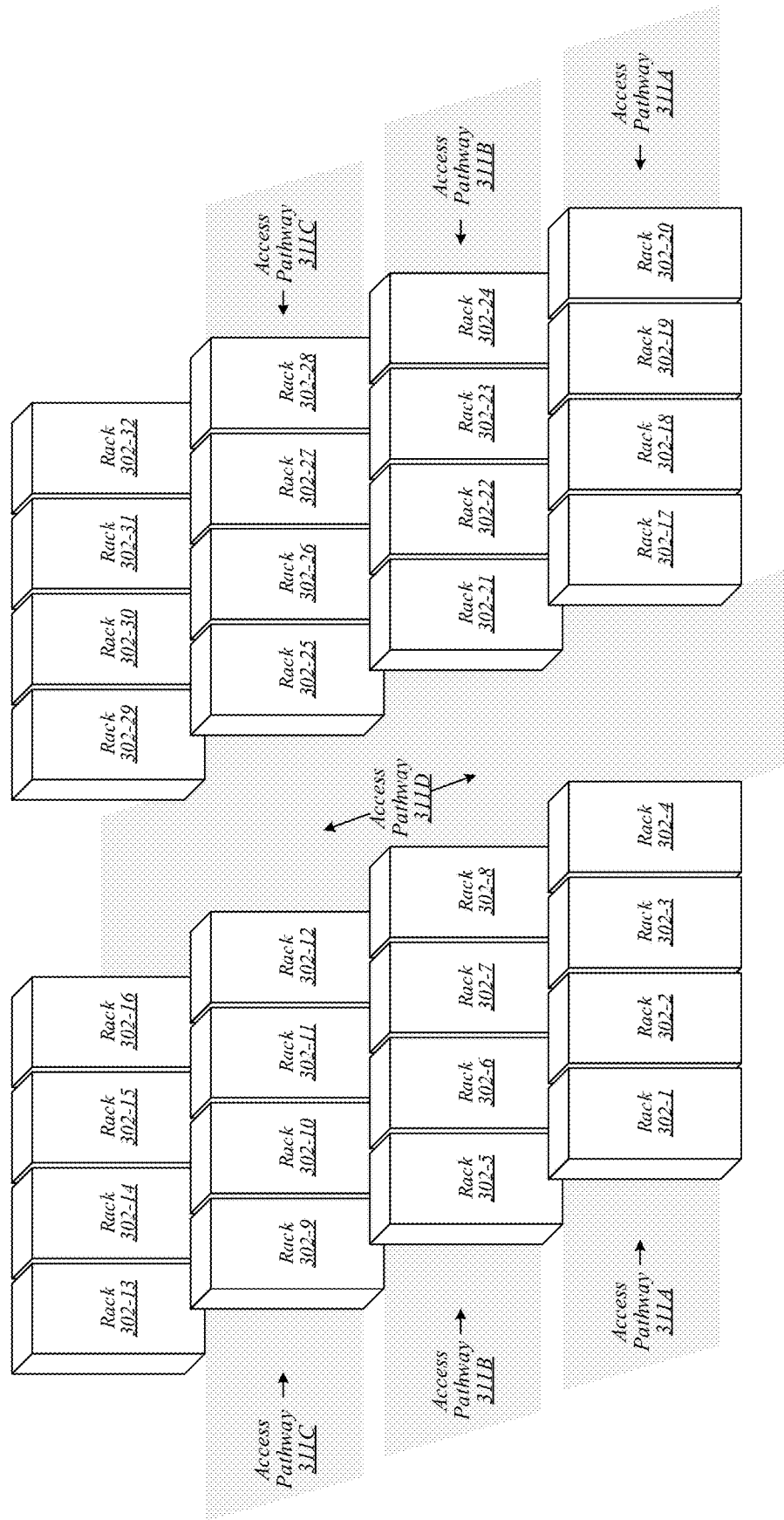
FIG. 3 illustrates an embodiment of a second data center.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
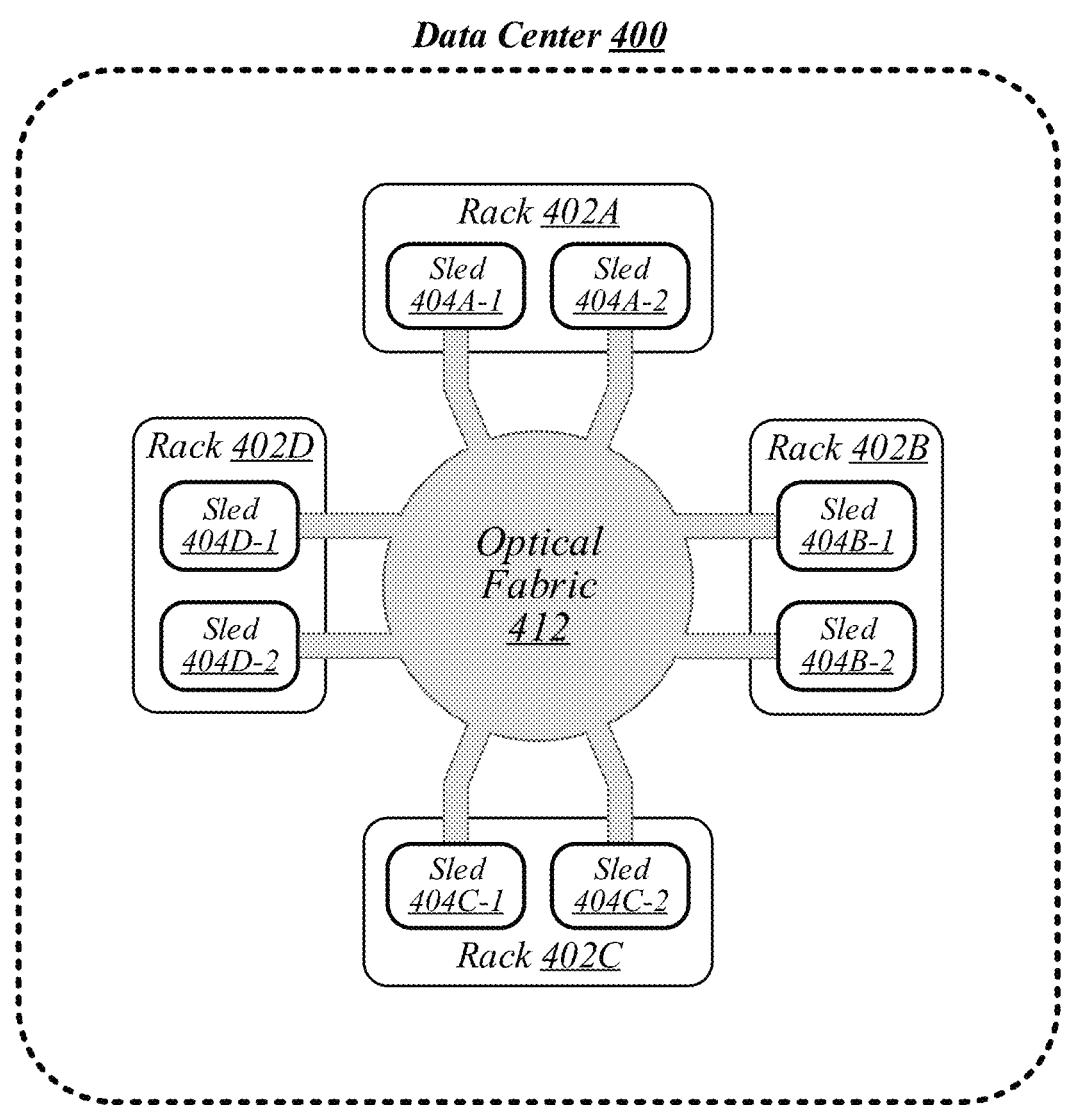
FIG. 4 illustrates an embodiment of a third data center.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
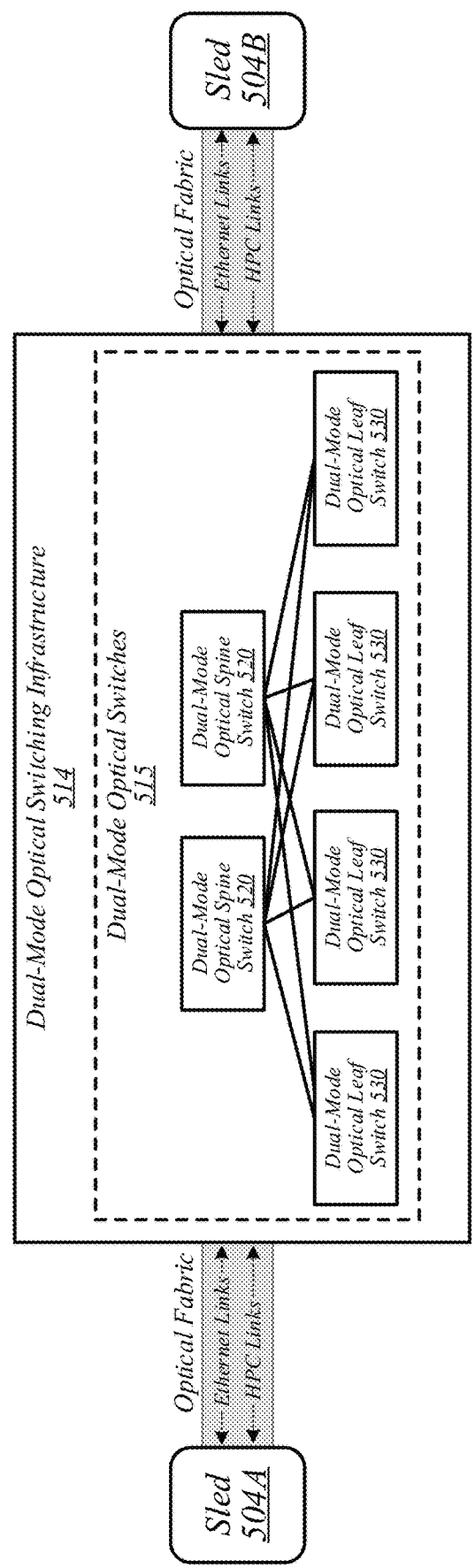
FIG. 5 illustrates an embodiment of a connectivity scheme.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
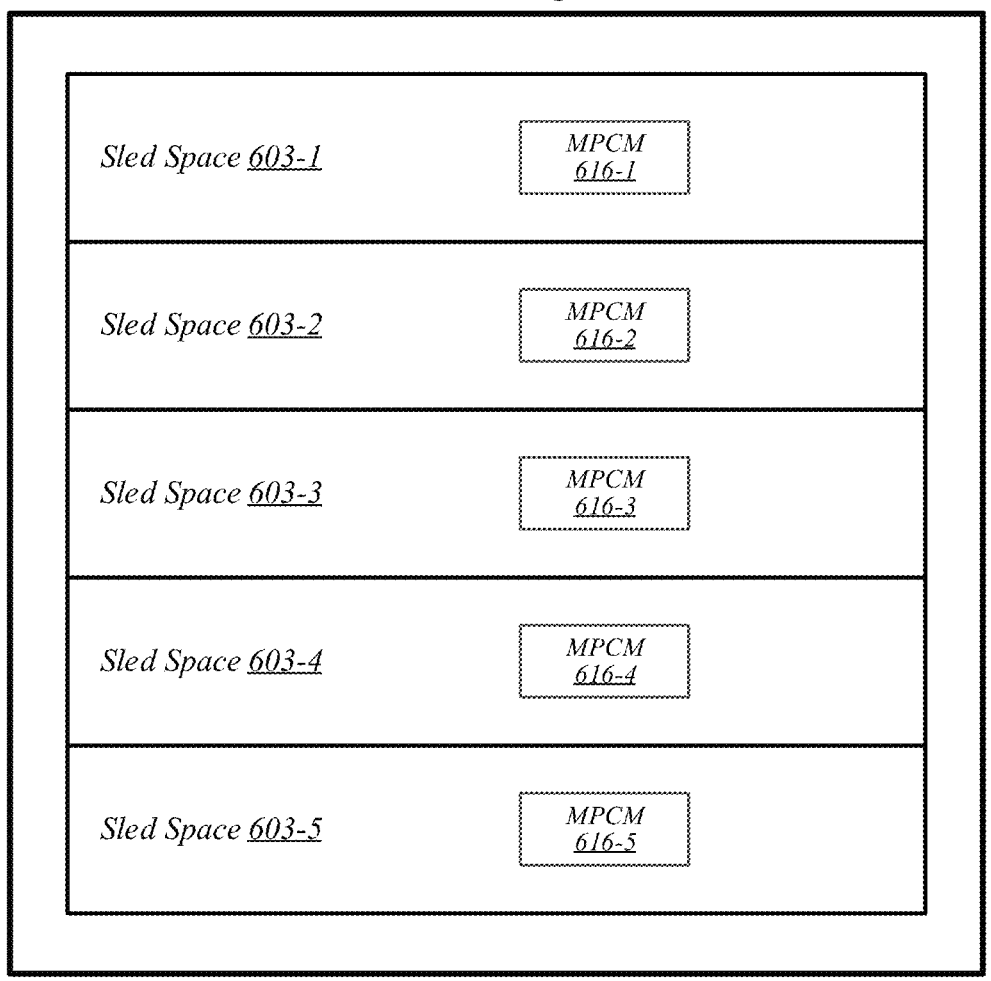
FIG. 6 illustrates an embodiment of first rack architecture.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
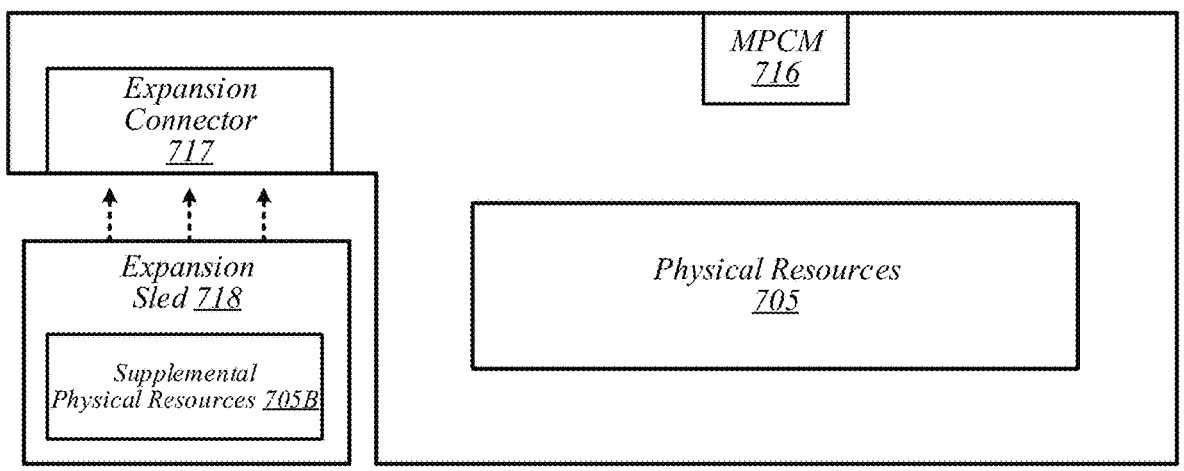
FIG. 7 illustrates an embodiment of a first sled.

Included among the types of sleds to be accommodated by rack architecture 600 may be one or more types of sleds that feature expansion capabilities. FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
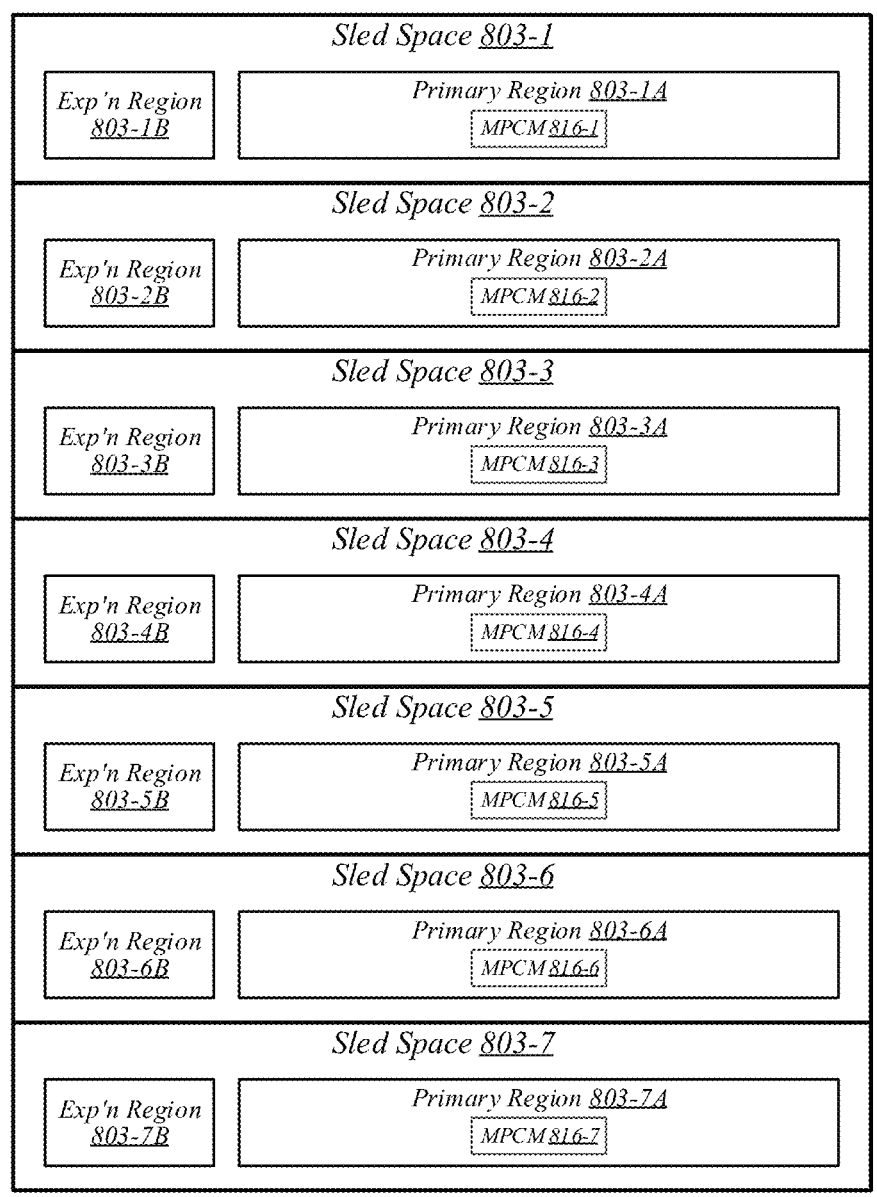
FIG. 8 illustrates an embodiment of a second rack architecture.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
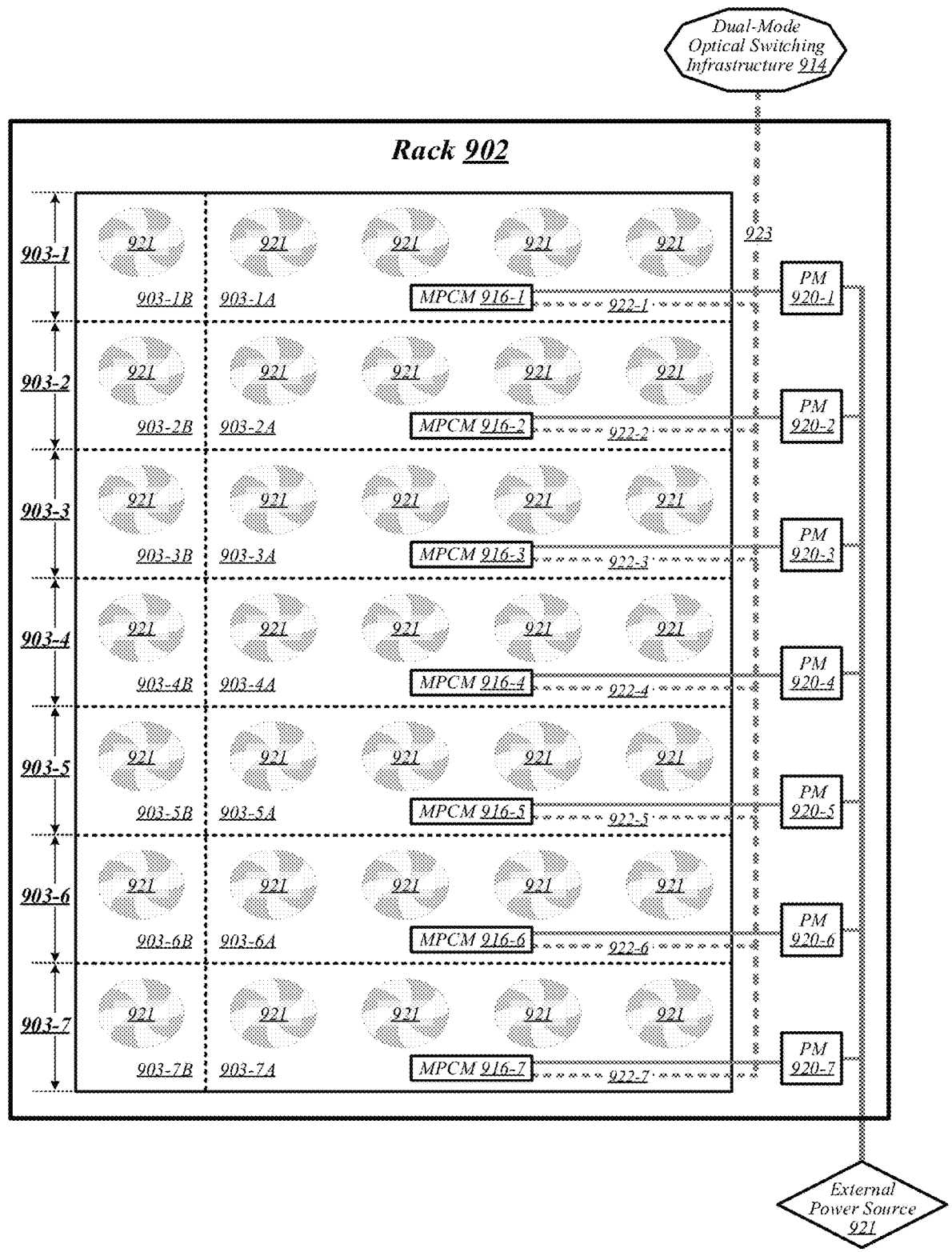
FIG. 9 illustrates an embodiment of a rack.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
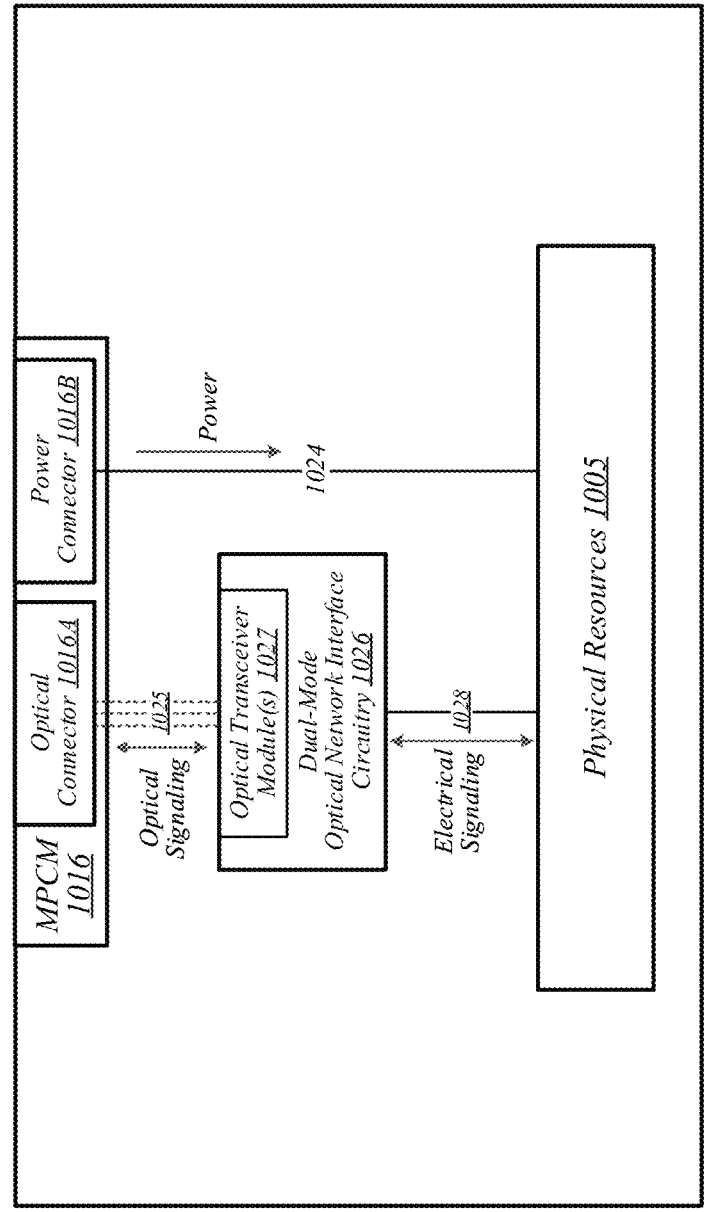
FIG. 10 illustrates an embodiment of a second sled.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
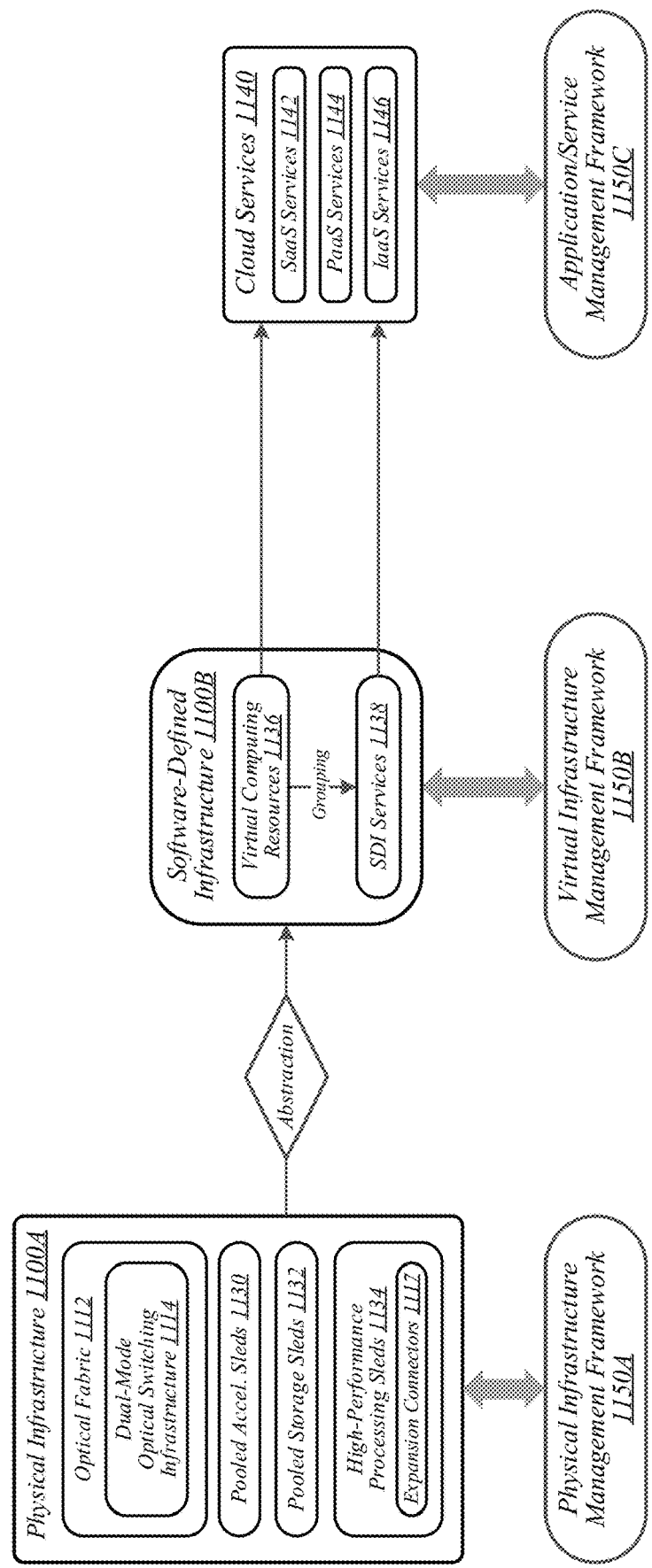
FIG. 11 illustrates an embodiment of a fourth data center.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is available globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
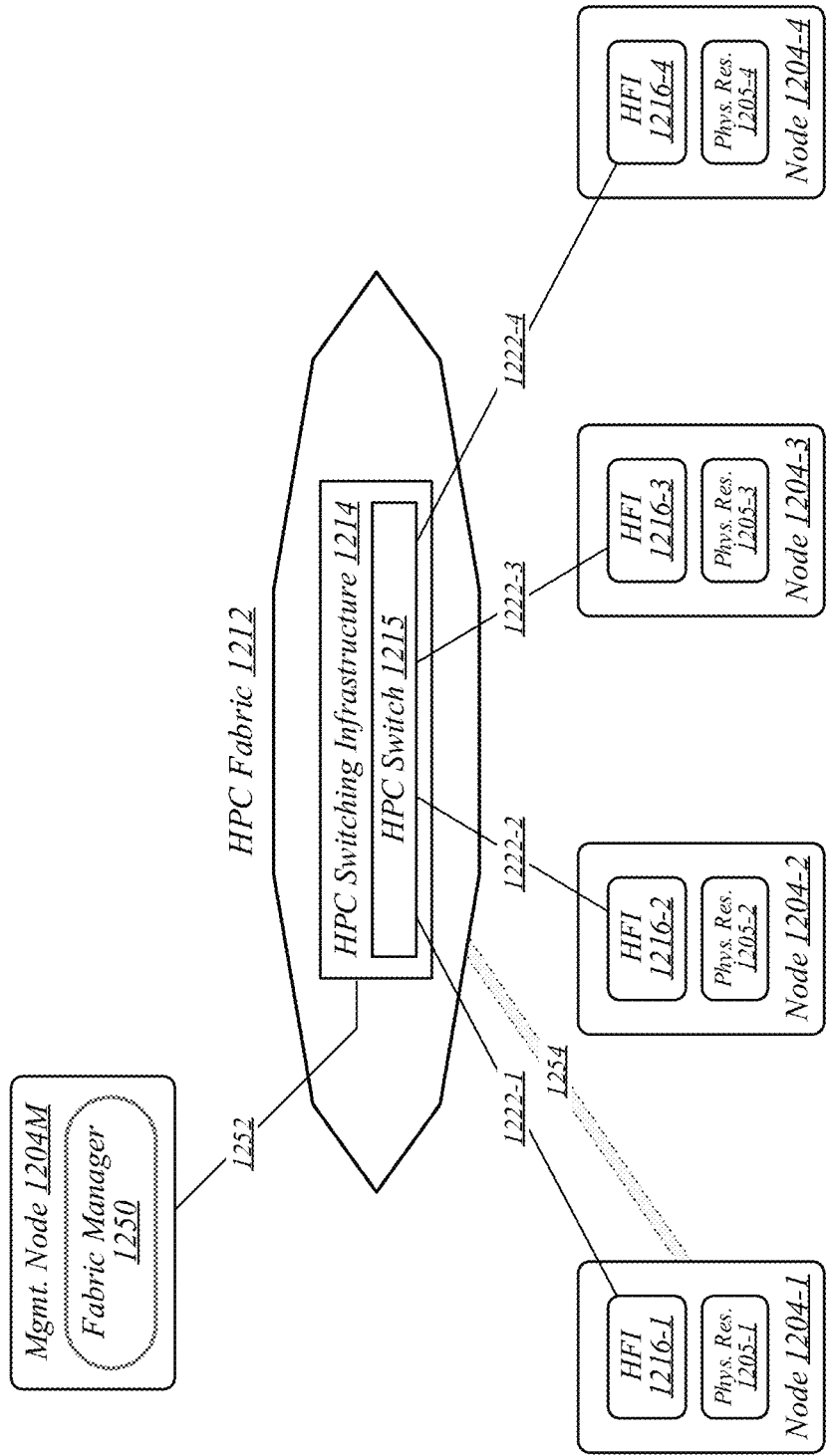
FIG. 12 illustrates an embodiment of a fifth data center.

FIG. 12 illustrates an example of a data center 1200 that may generally be representative of one in/for which one or more techniques described herein may be implemented in various embodiments. According to various embodiments, data center 1200 may be representative of one or more of data center 100 of FIG. 1, data center 300 of FIG. 3, data center 400 of FIG. 4, and data center 1100 of FIG. 11. The embodiments are not limited in this context.

In the example depicted in FIG. 12, data center 1200 comprises nodes 1204-1, 1204-2, 1204-3, and 1204-4. Residing at nodes 1204-1, 1204-2, 1204-3, and 1204-4 are respective sets of physical resources 1205-1, 1205-2, 1205-3, and 1205-4. Any given one of physical resources 1205-1 to 1205-4 may, according to a given embodiment, be representative of one or more of physical resources 105A, 105B, 105C, and 105D of FIG. 1, physical storage resources 205-1, physical accelerator resources 205-2, physical memory resources 205-3, and physical compute resources 205-4 of FIG. 2, physical resources 705 and supplemental physical resources 705B of FIG. 7, and physical resources 1005 of FIG. 10.

In various embodiments, nodes 1204-1 to 1204-4 may comprise compute nodes, and physical resources 1205-1 to 1205-4 may comprise physical compute resources such as CPUs. In some embodiments, each one of nodes 1204-1 to 1204-4 may comprise/correspond to a respective set of components/resources of a respective compute sled. For example, in various embodiments, an HFI 1216-1 of node 1204-1 may correspond to an optical interface on a compute sled, and a physical resource 1205-1 of node 1204-1 may correspond to a CPU on that compute sled. In various embodiments, multiple nodes may comprise/correspond to respective sets of components/resources that reside on a same sled. For example, in various embodiments, HFIs 1216-1 and 1216-2 of nodes 1204-1 and 1204-2 may respectively correspond to first and second optical interfaces on a dual-socket compute sled, and physical resources 1205-1 and 1205-2 of nodes 1204-1 and 1204-2 may respectively correspond to first and second CPUs on that compute sled. The embodiments are not limited to this example.

Nodes 1204-1, 1204-2, 1204-3, and 1204-4 also feature respective host fabric interfaces (HFIs) 1216-1, 1216-2, 1216-3, and 1216-4. HFIs 1216-1, 1216-2, 1216-3, and 1216-4 may generally enable the establishment of connectivity between respective nodes 1204-1, 1204-2, 1204-3, and 1204-4 and a high performance computing (HPC) fabric 1212. More particularly, as shown in the example of FIG. 12, HFIs 1216-1, 1216-2, 1216-3, and 1216-4 may enable the establishment of connectivity between nodes 1204-1, 1204-2, 1204-3, and 1204-4 and an HPC switch 1215 of an HPC switching infrastructure 1214 for HPC fabric 1212, via respective HPC interconnects 1222-1, 1222-2, 1222-3, and 1222-4. In some embodiments, HPC interconnects 1222-1 to 1222-4 may comprise optical cabling. In various embodiments, HPC switch 1215 may comprise an optical circuit switch, and may perform low-latency circuit switching of communications received from nodes 1204-1 to 1204-4 via respective HFIs 1216-1 to 1216-4 and HPC interconnects 1222-1 to 1222-4. The embodiments are not limited in this context.

In various embodiments, the physical connectivity established using HFIs 1216-1 to 1216-4, HPC interconnects 1222-1 to 1222-4, and HPC switch 1215 may provide the underlying physical layer support for high-speed data communication links via which data may pass to and/or from nodes 1204-1 to 1204-4. In some embodiments, for example, a physical resource 1205-1 residing at node 1204-1 may be provided with high bandwidth, low latency communicative connectivity to HPC fabric 1212 via an HPC data link 1254 supported by HFI 1216-1, HPC interconnect 1222-1, and HPC switch 1215. In various embodiments, HPC data link 1254 may comprise an Omni-path link. The embodiments are not limited in this context.

In various embodiments, in conjunction with ongoing operations of data center 1200, a fabric manager 1250 may generally be operative to provision, monitor, configure, and/or otherwise manage fabric resources of data center 1200. In various embodiments, fabric manager 1250 may perform provisioning, monitoring, configuration, and/or management operations in conjunction with establishing and/or managing high-speed data links such as HPC data link 1254. In some embodiments, in conjunction with establishing and/or managing a high-speed data link to/from a given node, fabric manager 1250 may need to configure an HFI of that node. For example, in order to establish and/or manage HPC data link 1254, fabric manager 1250 may need to configure the HFI 1216-1 at node 1204-1. The embodiments are not limited to this example.

Fabric manager 1250 may generally comprise an application executing at a node within data center 1200. In the example depicted in FIG. 12, fabric manager 1250 executes at a node 1204M, which is coupled with HPC switching infrastructure 1214 of HPC fabric 1212 via interconnect 1252. In various embodiments, interconnect 1252 may directly connect node 1204M with HPC switching infrastructure 1214. In various other embodiments, interconnect 1252 may indirectly connect node 1204M with HPC switching infrastructure 1214 via one or more intermediate switches, links, or other components. In various embodiments, for example, interconnect 1252 may connect node 1204M with a packet switch, which in turn may be connected with HPC switch 1215 by additional interconnect cabling. The embodiments are not limited to this example.

Figure 13:
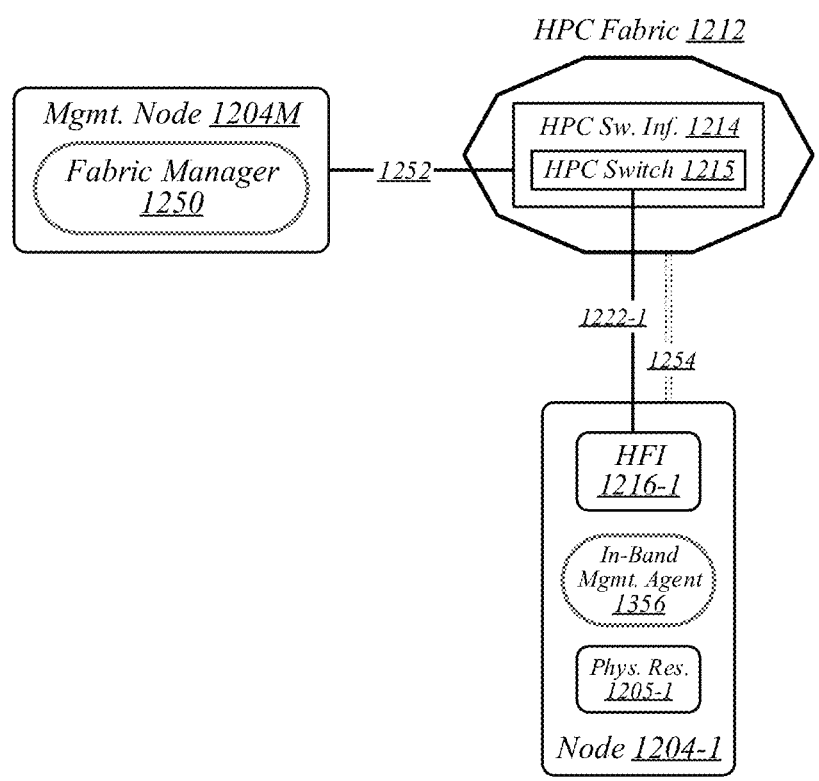
FIG. 13 illustrates an embodiment of a first operating environment.

FIG. 13 illustrates an example of an operating environment 1300 that may be representative of some embodiments in which fabric manager 1250 configures HFI 1216-1 using an in-band HFI configuration procedure. In operating environment 1300, in accordance with such an in-band HFI configuration procedure, fabric manager 1250 may conduct configuration of HFI 1216-1 by sending control information to an in-band management agent 1356 running at node 1204-1, and the in-band management agent 1356 may be operative to manage HFI 1216-1 in accordance with that control information. Control information that fabric manager 1250 sends to in-band management agent 1356 may arrive at node 1204-1 in the form of signals that HFI 1216-1 receives from HPC switch 1215 via HPC interconnect 1222-1.

Figure 14:
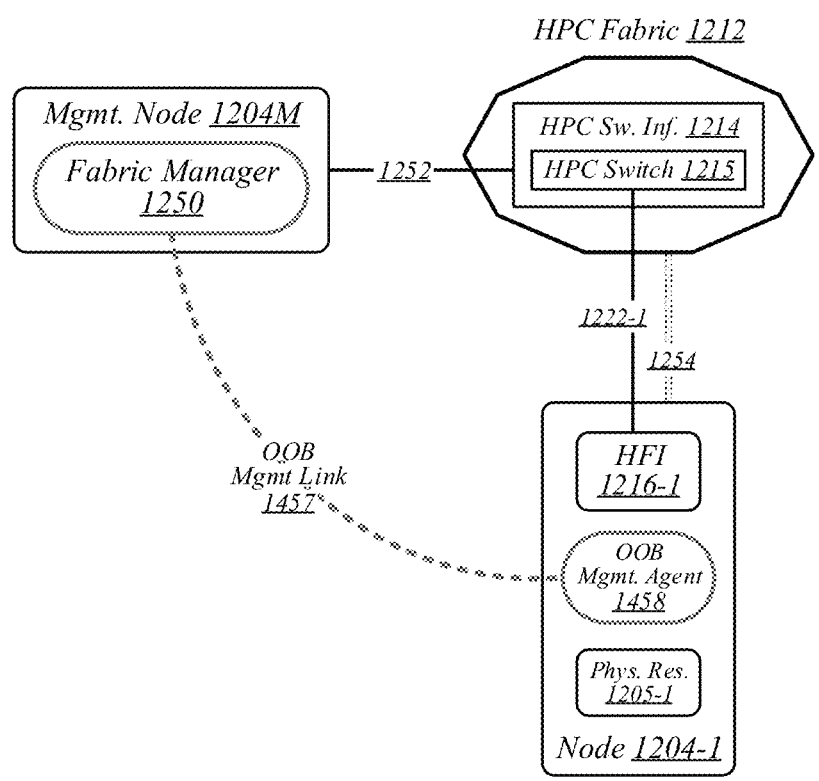
FIG. 14 illustrates an embodiment of a second operating environment.

FIG. 14 illustrates an example of an operating environment 1400 that may be representative of various embodiments in which fabric manager 1250 configures HFI 1216-1 using an out-of-band (OOB) HFI configuration procedure. In operating environment 1400, in accordance with such an OOB HFI configuration procedure, fabric manager 1250 may conduct configuration of HFI 1216-1 by sending management commands/information to an OOB management agent 1458 at node 1204-1, and the OOB management agent 1458 may be operative to manage HFI 1216-1 in accordance with such management commands/information. More particularly, fabric manager 1250 may send management commands/information to OOB management agent 1458 via an OOB management link 1457. OOB management link 1457 may generally comprise an application layer link that carries application layer messages used to convey management commands/information from fabric manager 1250 to OOB management agent 1458. In various embodiments, OOB management agent 1458 may send management commands/information to fabric manager 1250 as well, and OOB management link 1457 may additionally carry application layer messages used to convey such management commands/information from OOB management agent 1458 to fabric manager 1250. The embodiments are not limited in this context.

Figure 15:
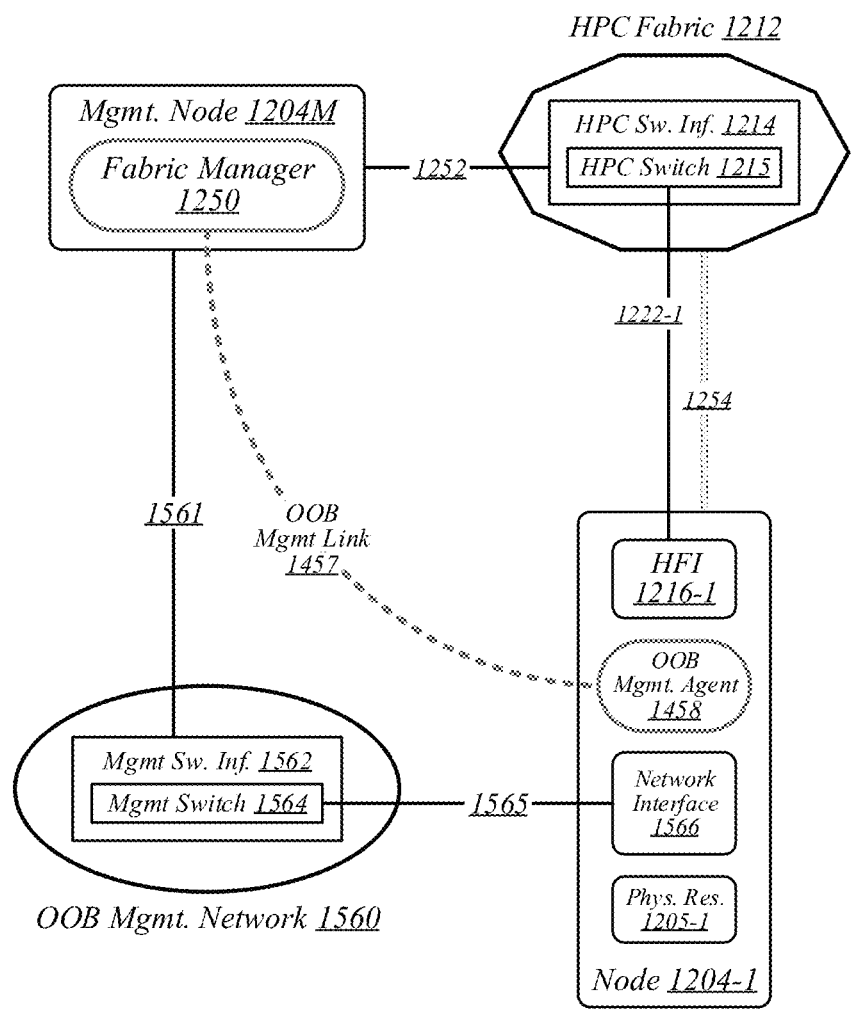
FIG. 15 illustrates an embodiment of a third operating environment.

FIG. 15 illustrates an example of an operating environment 1500 that may be representative of various embodiments. In operating environment 1500, networking infrastructure of an OOB management network 1560 may be utilized to establish/support the physical layer, link layer, network layer, and transport layer connectivity that collectively provides the underlying support for the application layer connectivity embodied by OOB management link 1457. As shown in FIG. 15, node 1204M may possess connectivity to a management switching infrastructure 1562 of OOB management network 1560 via an interconnect 1561. An interconnect 1565 may establish connectivity between a network interface 1566 at node 1204-1 and a management switch 1564 comprised in management switching infrastructure 1562. In some embodiments, OOB management network 1560 may comprise a packet-switched network. In various embodiments, network interface 1566 may comprise a packet-switched network interface, and may be capable of deconstructing packets received via interconnect 1565 and/or constructing packets for transmission over interconnect 1565. In various embodiments, management switching infrastructure 1562 may comprise a packet-switching infrastructure, and management switch 1564 may comprise a packet switch. The embodiments are not limited in this context.

In various embodiments, the physical connectivity provided by interconnect 1565 may be leveraged to support the establishment of link layer connectivity between respective link layer entities at nodes 1204-1 and 1204M. In various embodiments, such link layer connectivity may comprise an Ethernet link. In some embodiments, link layer connectivity between respective entities at nodes 1204-1 and 1204M may in turn be used to support the establishment of transport layer connectivity between respective transport layer entities at nodes 1204-1 and 1204M. In various embodiments, communications between those transport layer entities may be performed in accordance with the Transmission Control Protocol (TCP). In various embodiments, communications between underlying network layer entities of those transport layer entities may be performed in accordance with the Internet Protocol (IP). The embodiments are not limited in this context.

In various embodiments, based on connectivity at the aforementioned lower layers, application layer connectivity may be established between fabric manager 1250 and OOB management agent 1458, in the form of OOB management link 1457. In such embodiments, control information/commands that fabric manager 1250 sends to OOB management agent 1458 via OOB management link 1457 may arrive at node 1204-1 in the form of signals that network interface 1566 receives from management switch 1564 via interconnect 1565. Meanwhile, data sent to node 1204-1 via HPC data link 1254 may arrive at node 1204-1 in the form of signals that HFI 1216-1 receives from HPC switch 1215 via HPC interconnect 1222-1.

Figure 16:
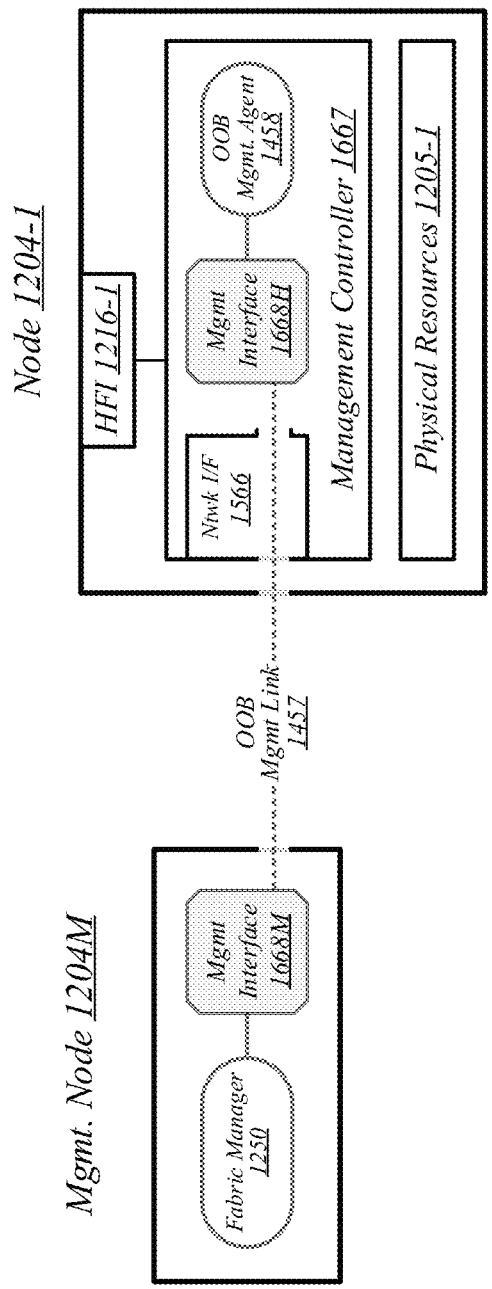
FIG. 16 illustrates an embodiment of a fourth operating environment.

FIG. 16 illustrates an example of an operating environment 1600 that may be representative of some embodiments. In operating environment 1600, fabric manager 1250 and OOB management agent 1458 may access OOB management link 1457 via respective management interfaces 1668M and 1668H. In various embodiments, management interfaces 1668M and 1668H may comprise application programming interfaces (APIs).

In various embodiments, the use of management interfaces 1668M and 1668H for communications over OOB management link 1457 may involve the utilization of protocols, resources, and functions defined by an OOB systems management standard. In various embodiments, for example, management interfaces 1668M and 1668H may comprise Redfish interfaces. In various such embodiments, fabric manager 1250 and OOB management agent 1458 may utilize protocols, resources, and functions defined in one or more Distributed Management Task Force (DMTF) Redfish specifications in conjunction with using management interfaces 1668M and 1668H to exchange communications via OOB management link 1457. In a particular example, in conjunction with communicating via OOB management link 1457, fabric manager 1250 and OOB management agent 1458 may utilize protocols, resources, and functions defined in Redfish Scalable Platforms Management API Specification Version 1.2.0, released May 21, 2017, and/or one or more predecessors, progeny, and/or variants thereof. In some embodiments, configuration commands that fabric manager sends over OOB management link 1457 in order to configure HFI 1216-1 may take the form of hypertext transfer protocol (HTTP) messages. The embodiments are not limited to this example.

In the example depicted in FIG. 16, OOB management agent 1458 executes on a management controller 1667 at node 1204-1, and network interface 1566 comprises an interface of that management controller 1667. Management controller 1667 may generally comprise control circuitry and/or logic configured to control one or more components of node 1204-1, such as network interface 1566, HFI 1216-1, and physical resources 1205-1. In various embodiments, based on commands received from fabric manager 1250 via OOB management link 1457, OOB management agent 1458 may invoke control capabilities/functions of management controller 1667 to control and/or configure HFI 1216-1. The embodiments are not limited to this example.

Figure 17:
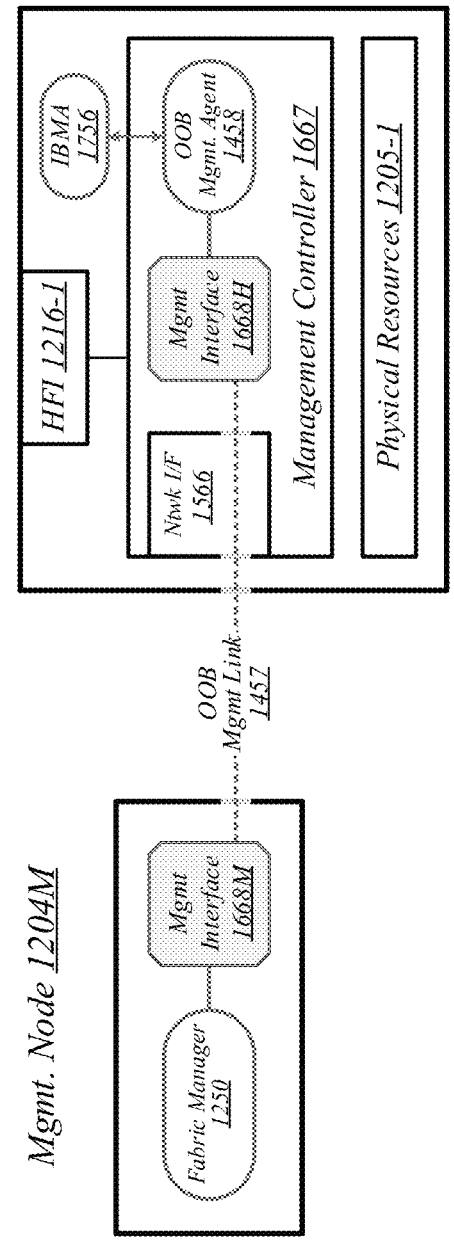
FIG. 17 illustrates an embodiment of a fifth operating environment.

FIG. 17 illustrates an example of an operating environment 1700 that may be representative of various embodiments. In operating environment 1700, node 1204-1 is capable of running an in-band management agent (IBMA) 1756 concurrently with operation of OOB management agent 1458. In some embodiments, OOB management agent 1458 may be capable of controlling the availability of IBMA 1756 to client software executing at node 1204-1. In various embodiments, OOB management agent 1458 may control the availability of IBMA 1756 based on whether or not in-band configuration of HFI 1216-1 is to be permitted. In various embodiments, if in-band configuration of HFI 1216-1 is to be permitted, OOB management agent 1458 may make in-band control/configuration mechanisms of IBMA 1756 available to be used for such in-band configuration. In various embodiments, OOB management agent 1458 may disallow the invocation of in-band control/configuration mechanisms of IBMA 1756 if in-band configuration of HFI 1216-1 is not to be permitted. The embodiments are not limited in this context.

Figure 18:
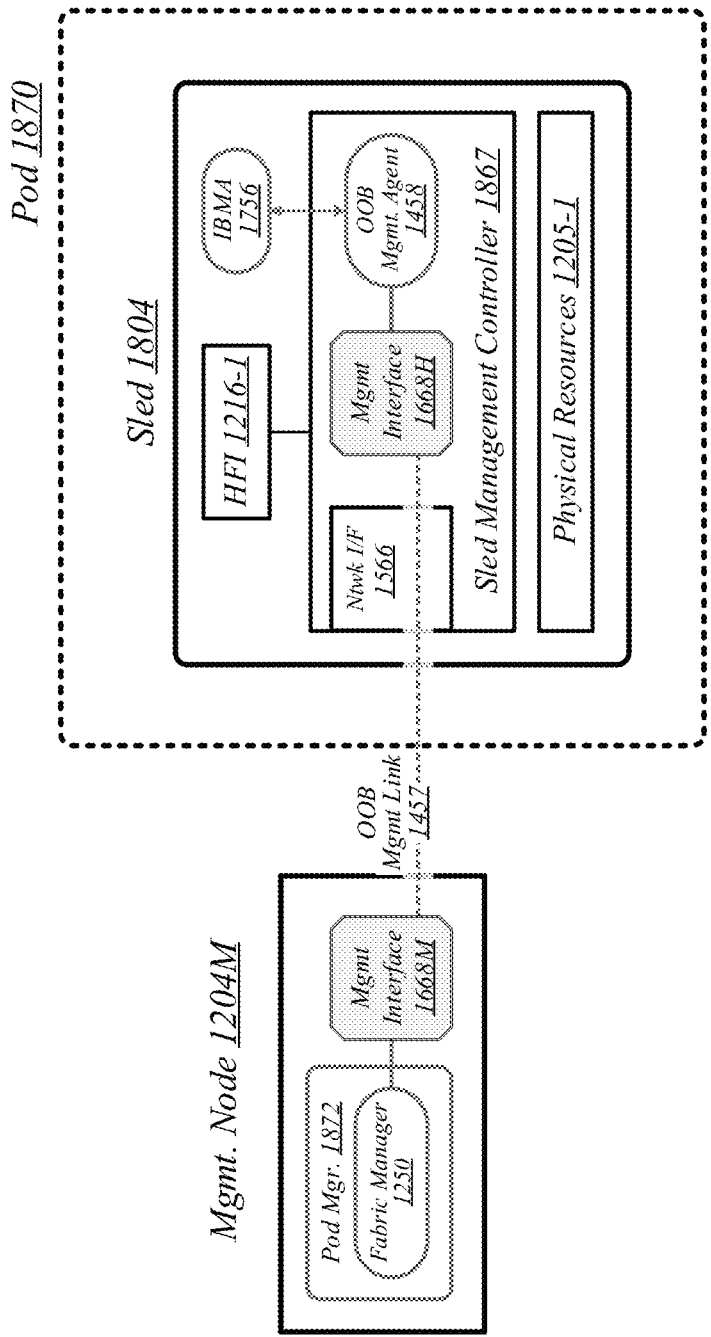
FIG. 18 illustrates an embodiment of a sixth operating environment.

In some embodiments, node 1204-1 may generally correspond to one or more components and/or features residing on/at a resource sled. FIG. 18 illustrates an operating environment 1800 that may be representative of various such embodiments. More particularly, operating environment 1800 may be representative of various embodiments in which node 1204-1 corresponds to one or more components and/or features residing on/at a sled 1804. Sled 1804 comprises a sled management controller 1867, which may comprise circuitry and/or logic configured to control one or more other components of sled 1804, such as HFI 1216-1 and physical resources 1205-1.

In various embodiments, sled 1804 may reside within a rack (not shown), which may constitute one of multiple racks in a pod 1870. In some embodiments, a pod manager 1872 executing at management node 1204M may be responsible for managing various aspects of operations in pod 1870. In various embodiments, fabric manager 1250 may comprise management functionality that pod manager 1872 uses to manage fabric interconnects in pod 1870. In various embodiments, OOB management agent 1458 may execute at sled management controller 1867. In various embodiments, OOB management agent 1458 may be presented with management interface 1668H, which it may use to communicate with fabric manager 1250 via OOB management link 1457 and management interface 1668M. In some embodiments, management interfaces 1668H and 1668M may comprise Redfish interfaces. The embodiments are not limited in this context.

Figure 19:
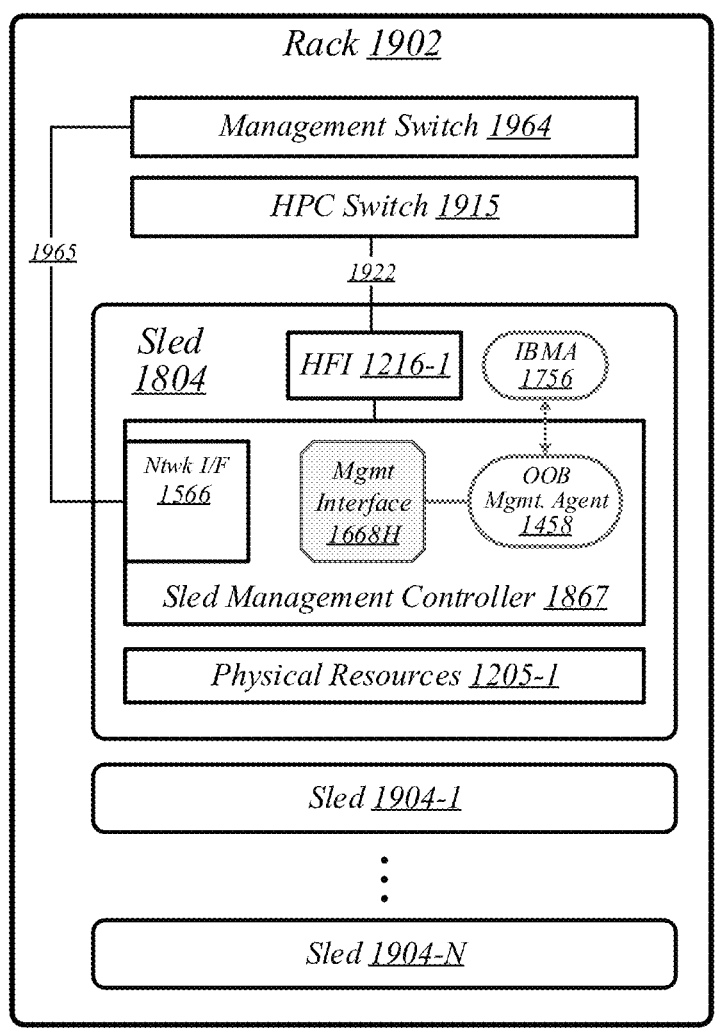
FIG. 19 illustrates an embodiment of a seventh operating environment.

FIG. 19 illustrates an example of an operating environment 1900 that may be representative of various embodiments. In operating environment 1900, sled 1804 of FIG. 18 is housed in a rack 1902, along with one or more additional sleds 1904-1 to 1904-N, where N represents a positive integer. Also housed in rack 1902 are an HPC switch 1915 and a management switch 1964. According to some embodiments, HPC switch 1915 may be representative of HPC switch 1215 of FIGS. 12 to 15, and management switch 1964 may be representative of management switch 1564 of FIG. 15. The embodiments are not limited in this context.

In various embodiments, an HPC interconnect 1922 may provide physical connectivity between HPC switch 1915 and HFI 1216-1 on sled 1804, and connectivity with HPC switch 1915 may enable sled 1804 to communicate via high-speed data communication links supported by an HPC fabric such as HPC fabric 1212 of FIGS. 12 to 15. In various embodiments, HPC interconnect 1922 may comprise an optical interconnect, such as optical cabling. According to some embodiments, HPC interconnect 1922 may be representative of HPC interconnect 1222-1 of FIGS. 12 to 15. In various embodiments, some or all of sleds 1904-1 to 1904-N may also possess connectivity with HPC switch 1915, and thus may also be able to communicate over high-speed data communication links supported by the HPC fabric. The embodiments are not limited in this context.

In various embodiments, an interconnect 1965 may provide physical connectivity between management switch 1964 and the network interface 1566 of sled management controller 1867 on sled 1804, and connectivity with management switch 1964 may enable sled 1804 to communicate via OOB management links supported by an OOB management network such as OOB management network 1560 of FIG. 15. According to various embodiments, interconnect 1965 may be representative of interconnect 1565 of FIG. 15. In some embodiments, some or all of sleds 1904-1 to 1904-N may also possess connectivity with management switch 1964, and thus may also be able to communicate over OOB management links supported by the OOB management network. The embodiments are not limited in this context.

Figure 20:
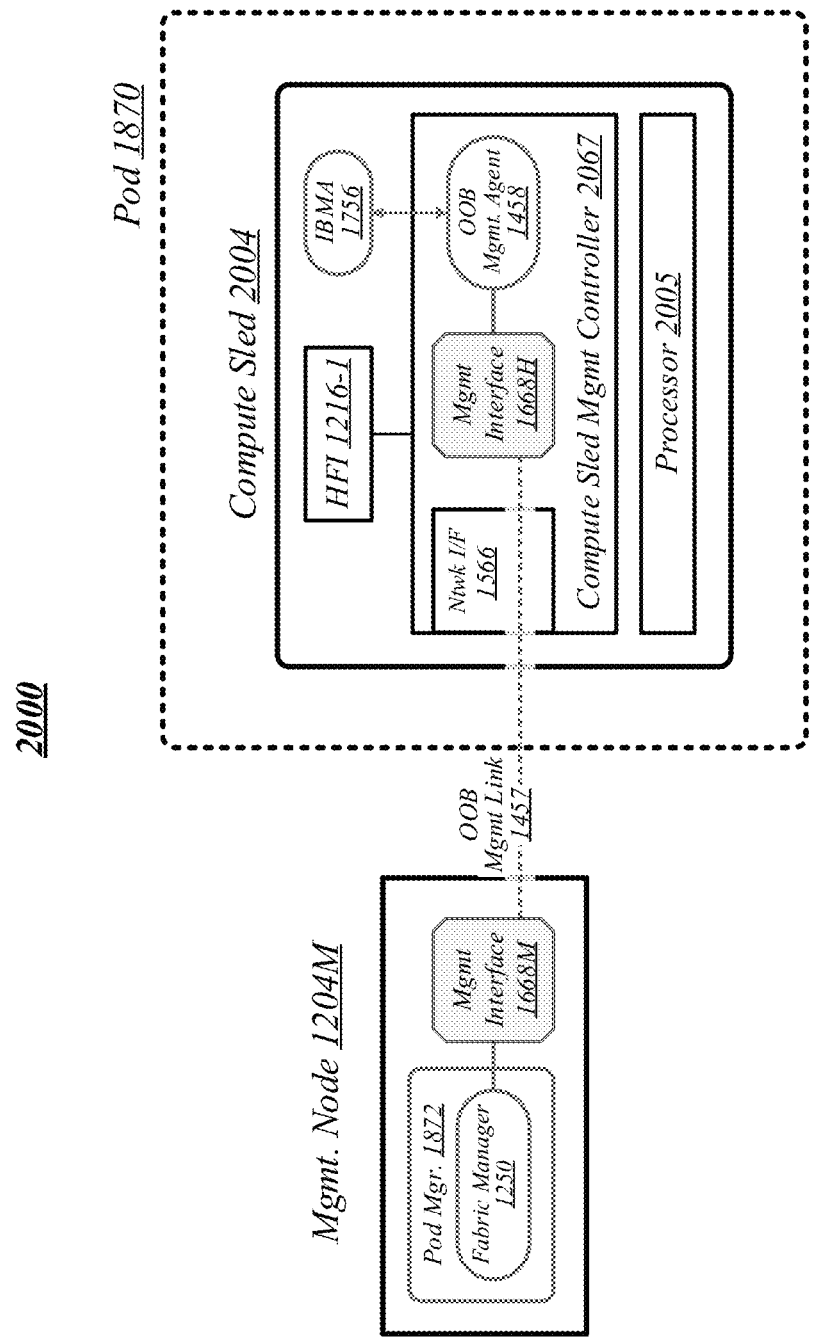
FIG. 20 illustrates an embodiment of a eighth operating environment.

FIG. 20 illustrates an example of an operating environment 2000 that may be representative of various embodiments. More particularly, operating environment 2000 may be representative of various embodiments in which node 1204-1 is a compute node comprised of features of a compute sled 2004. In such a case, in the context of operating environments 1600 and 1700 of FIGS. 16 and 17, management controller 1667 may be implemented as a compute sled management controller 2067, and network interface 1566 may comprise an interface of that compute sled management controller 2067. Compute sled 2004 may comprise a processor 2005, which may use HFI 1216-1 to communicate over high-speed/HPC data links. As in operating environments 1600, 1700, and 1800, OOB management agent 1458 may control/configure HFI 1216-1 based on commands received from fabric manager 1250 via management interface 1668H and OOB management link 1457. The embodiments are not limited in this context.

Figure 21:
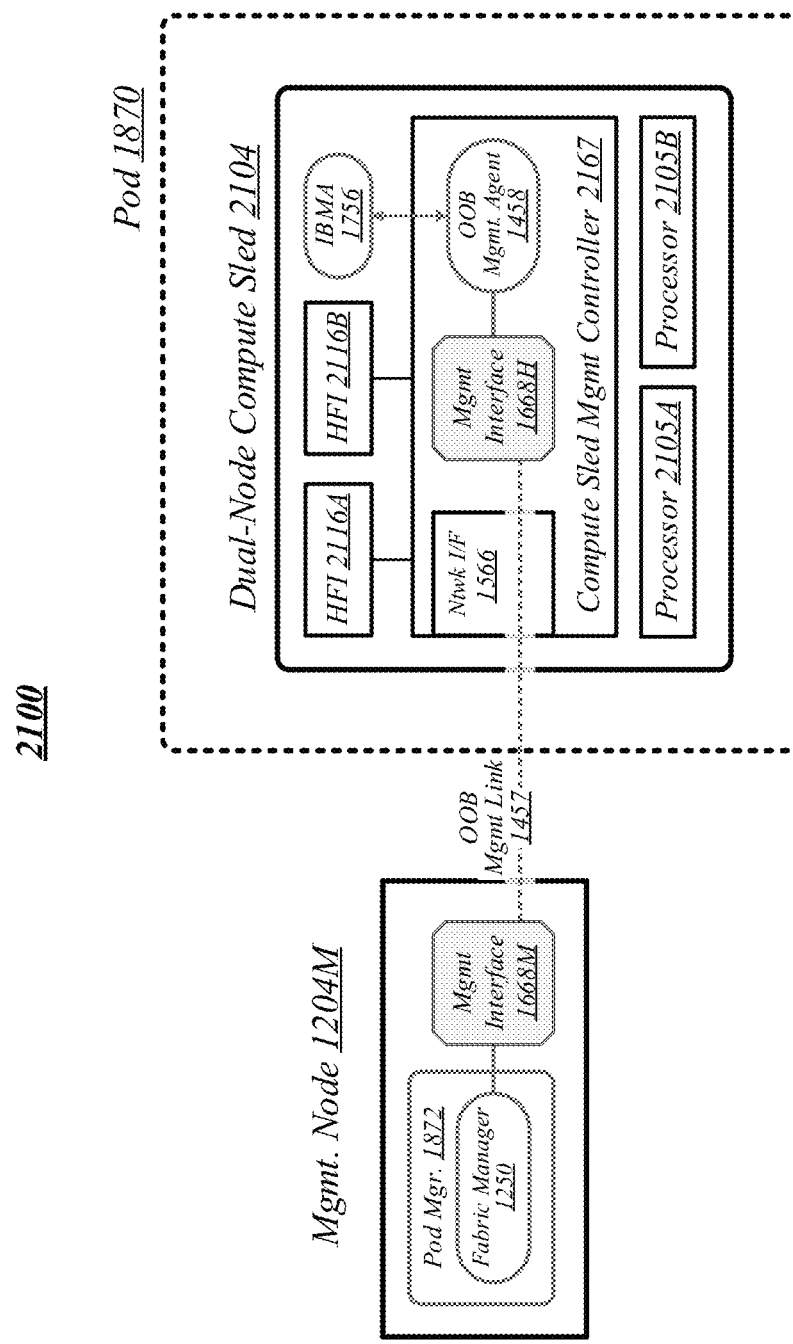
FIG. 21 illustrates an embodiment of a ninth operating environment.

FIG. 21 illustrates an example of an operating environment 2100 that may be representative of various embodiments. More particularly, operating environment 2100 may be representative of some embodiments in which compute sled 2004 of FIG. 20 is implemented using a dual-node compute sled 2104. As shown in FIG. 21, dual-node compute sled 2104 may comprise processors 2105A and 2105B, which may use respective HFIs 2116A and 2116B for communications over high-speed/HPC data links. In the context of operating environment 2000, processor 2005 may represent one of the two processors 2105A and 2105B of dual-node compute sled 2104, HFI 1216-1 may represent the HFI used by that processor, and network interface 1566 may comprise an interface of a compute sled management controller 2167 of dual-node compute sled 2104. The embodiments are not limited to this example.

Figure 22:
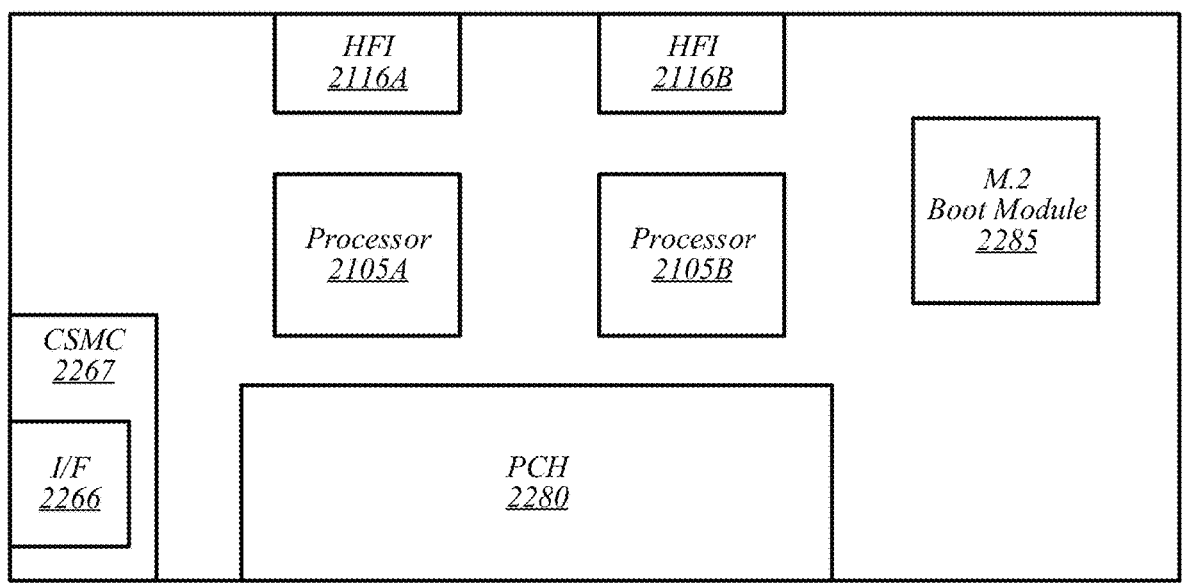
FIG. 22 illustrates an embodiment of a third sled.

FIG. 22 illustrates an example of a compute sled 2204 that may be representative of any or all of sled 1804, compute sled 2004, and dual-node compute sled 2104 according to various embodiments. Like dual-node compute sled 2104, compute sled 2204 may comprise processors 2105A and 2105B, which may use respective HFIs 2116A and 2116B for communications over high-speed/HPC data links. In the context of dual-node compute sled 2104, compute sled management controller 2167 may represent a compute sled management controller (CSMC) 2267 of compute sled 2204, and network interface 1566 may be implemented using an interface (I/F) 2266 of compute sled management controller 2267. In various embodiments, interface 2266 may comprise a reduced gigabit media-independent interface (RGMII). In various embodiments, CSMC 2267 may be implemented using a baseboard management controller (BMC). In some embodiments, CSMC 2267 may be implemented using a field-programmable gate array (FPGA). In this example, compute sled 2204 also comprises a platform controller hub (PCH) 2280 and an M.2 boot module 2285. The embodiments are not limited in this context.

Figure 23:
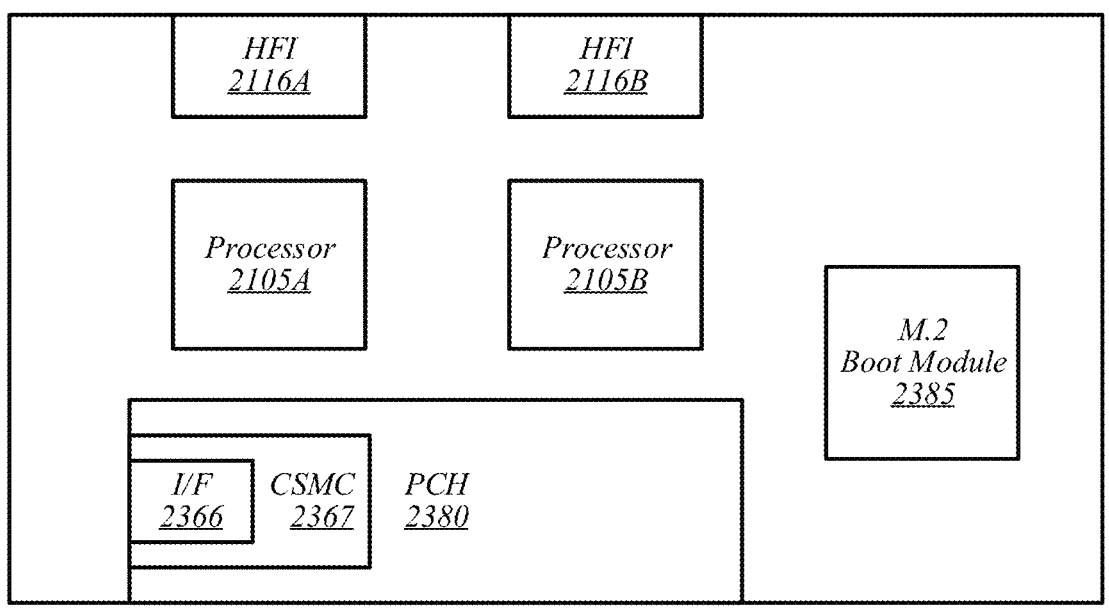
FIG. 23 illustrates an embodiment of a fourth sled.

FIG. 23 illustrates an example of a compute sled 2304 that may be representative of any or all of sled 1804, compute sled 2004, and dual-node compute sled 2104 according to various embodiments. Like compute sled 2204, compute sled 2304 may comprise processors 2105A and 2105B, which may use respective HFIs 2116A and 2116B for communications over high-speed/HPC data links. Compute sled 2304 may also comprise a compute sled management controller (CSMC) 2367, a platform controller hub (PCH) 2380, and an M.2 boot module 2385. In the context of dual-node compute sled 2104, compute sled management controller 2167 may represent CSMC 2367, and network interface 1566 may be implemented using an interface (I/F) 2366 of CSMC 2367. In various embodiments, interface 2366 may comprise a reduced gigabit media-independent interface (RGMII). In contrast to CSMC 2267, which is external to the PCH 2280 of compute sled 2204, CSMC 2367 may be comprised within the PCH 2380 of compute sled 2304. In various embodiments, capabilities/functions of PCH 2380 may be used to implement an innovation engine that is capable of serving as CSMC 2367. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus, comprising a packet-switched network interface to deconstruct a packet received via an out-of-band management network, and control circuitry to execute an out-of-band management agent, the out-of-band management agent to identify a configuration command comprised in the received packet, and control an optical circuit-switched network interface based on the configuration command.

Example 2 is the apparatus of Example 1, the out-of-band management agent to receive the configuration command by accessing an application layer interface.

Example 3 is the apparatus of Example 2, the application layer interface to comprise a Redfish interface.

Example 4 is the apparatus of any of Examples 2 to 3, the out-of-band management agent to receive a hypertext transfer protocol (HTTP) message via the application layer interface, the HTTP message to comprise the configuration command.

Example 5 is the apparatus of any of Examples 1 to 4, the packet-switched network interface to comprise an Ethernet interface.

Example 6 is the apparatus of Example 5, the packet-switched network interface to comprise a reduced gigabit media-independent interface (RGMII).

Example 7 is the apparatus of any of Examples 1 to 6, the optical circuit-switched network interface to comprise a host fabric interface (HFI).

Example 8 is the apparatus of any of Examples 1 to 7, the out-of-band management agent to pass control of the optical circuit-switched network interface to an in-band management agent based on a determination to permit in-band configuration of the optical circuit-switched network interface.

Example 9 is at least one non-transitory computer-readable storage medium comprising a set of instructions that, when executed by processing circuitry, cause a network fabric management node to determine to configure an optical circuit-switched network interface of a sled, generate an interface configuration command, and send the interface configuration command over an out-of-band management link to an out-of-band management agent for the optical circuit-switched network interface.

Example 10 is the at least one non-transitory computer-readable storage medium of Example 9, comprising instructions that, when executed by the processing circuitry, cause the network fabric management node to send the interface configuration command over the out-of-band management link by accessing an application layer interface.

Example 11 is the at least one non-transitory computer-readable storage medium of Example 10, the application layer interface to comprise a Redfish interface.

Example 12 is the at least one non-transitory computer-readable storage medium of any of Examples 10 to 11, comprising instructions that, when executed by the processing circuitry, cause the network fabric management node to use the application layer interface to send a hypertext transfer protocol (HTTP) message to the out-of-band management agent, the HTTP message to comprise the interface configuration command.

Example 13 is the at least one non-transitory computer-readable storage medium of any of Examples 9 to 12, the sled to comprise a compute sled.

Example 14 is the at least one non-transitory computer-readable storage medium of any of Examples 9 to 13, the optical circuit-switched network interface to comprise a host fabric interface.

Example 15 is the at least one non-transitory computer-readable storage medium of any of Examples 9 to 14, comprising instructions that, when executed by the processing circuitry, cause the network fabric management node to construct a packet for transmission over a packet-switched network, the packet to comprise the interface configuration command.

Example 16 is the at least one non-transitory computer-readable storage medium of Example 15, the packet-switched network to comprise an out-of-band management network.

Example 17 is a compute sled, comprising one or more processors, an optical circuit-switched network interface, and a packet-switched network interface to deconstruct a packet received via an out-of-band management network, and control circuitry to execute an out-of-band management agent, the out-of-band management agent to identify a configuration command comprised in the received packet, and control the optical circuit-switched network interface based on the configuration command.

Example 18 is the compute sled of Example 17, the out-of-band management agent to receive the configuration command by accessing an application layer interface.

Example 19 is the compute sled of Example 18, the application layer interface to comprise a Redfish interface.

Example 20 is the compute sled of any of Examples 18 to 19, the out-of-band management agent to receive a hypertext transfer protocol (HTTP) message via the application layer interface, the HTTP message to comprise the configuration command.

Example 21 is the compute sled of any of Examples 17 to 20, the packet-switched network interface to comprise an Ethernet interface.

Example 22 is the compute sled of Example 21, the packet-switched network interface to comprise a reduced gigabit media-independent interface (RGMII).

Example 23 is the compute sled of any of Examples 17 to 22, the optical circuit-switched network interface to comprise a host fabric interface (HFI).

Example 24 is the compute sled of any of Examples 17 to 23, the out-of-band management agent to pass control of the optical circuit-switched network interface to an in-band management agent based on a determination to permit in-band configuration of the optical circuit-switched network interface.

Example 25 is the compute sled of any of Examples 17 to 24, comprising an M.2 boot module.

Example 26 is at least one computer-readable storage medium comprising a set of instructions that, when executed, cause an out-of-band management agent to deconstruct a packet received via an out-of-band management network, identify a configuration command comprised in the received packet, and control an optical circuit-switched network interface based on the configuration command.

Example 27 is the at least one computer-readable storage medium of Example 26, comprising instructions that, when executed, cause the out-of-band management agent to receive the configuration command by accessing an application layer interface.

Example 28 is the at least one computer-readable storage medium of Example 27, the application layer interface to comprise a Redfish interface.

Example 29 is the at least one computer-readable storage medium of any of Examples 27 to 28, comprising instructions that, when executed, cause the out-of-band management agent to receive a hypertext transfer protocol (HTTP) message via the application layer interface, the HTTP message to comprise the configuration command.

Example 30 is the at least one computer-readable storage medium of any of Examples 26 to 29, the packet-switched network interface to comprise an Ethernet interface.

Example 31 is the at least one computer-readable storage medium of Example 30, the packet-switched network interface to comprise a reduced gigabit media-independent interface (RGMII).

Example 32 is the at least one computer-readable storage medium of any of Examples 26 to 31, the optical circuit-switched network interface to comprise a host fabric interface (HFI).

Example 33 is the at least one computer-readable storage medium of any of Examples 26 to 32, comprising instructions that, when executed, cause the out-of-band management agent to pass control of the optical circuit-switched network interface to an in-band management agent based on a determination to permit in-band configuration of the optical circuit-switched network interface.

Example 34 is an apparatus, comprising processing circuitry, and computer-readable storage media storing instructions that, when executed by the processing circuitry, cause a network fabric management node to determine to configure an optical circuit-switched network interface of a sled, generate an interface configuration command, and send the interface configuration command over an out-of-band management link to an out-of-band management agent for the optical circuit-switched network interface.

Example 35 is the apparatus of Example 34, the computer-readable storage media storing instructions that, when executed by the processing circuitry, cause the network fabric management node to send the interface configuration command over the out-of-band management link by accessing an application layer interface.

Example 36 is the apparatus of Example 35, the application layer interface to comprise a Redfish interface.

Example 37 is the apparatus of any of Examples 35 to 36, the computer-readable storage media storing instructions that, when executed by the processing circuitry, cause the network fabric management node to use the application layer interface to send a hypertext transfer protocol (HTTP) message to the out-of-band management agent, the HTTP message to comprise the interface configuration command.

Example 38 is the apparatus of any of Examples 34 to 37, the sled to comprise a compute sled.

Example 39 is the apparatus of any of Examples 34 to 38, the optical circuit-switched network interface to comprise a host fabric interface.

Example 40 is the apparatus of any of Examples 34 to 39, the computer-readable storage media storing instructions that, when executed by the processing circuitry, cause the network fabric management node to construct a packet for transmission over a packet-switched network, the packet to comprise the interface configuration command.

Example 41 is the apparatus of Example 40, the packet-switched network to comprise an out-of-band management network.

Example 42 is at least one computer-readable storage medium storing instructions that, when executed by processing circuitry of a compute sled, cause an out-of-band management agent of the compute sled to deconstruct a packet received via an out-of-band management network, identify a configuration command comprised in the received packet, and control the optical circuit-switched network interface based on the configuration command.

Example 43 is the at least one computer-readable storage medium of Example 42, storing instructions that, when executed by processing circuitry of the compute sled, cause the out-of-band management agent to receive the configuration command by accessing an application layer interface.

Example 44 is the at least one computer-readable storage medium of Example 43, the application layer interface to comprise a Redfish interface.

Example 45 is the at least one computer-readable storage medium of any of Examples 43 to 44, storing instructions that, when executed by processing circuitry of the compute sled, cause the out-of-band management agent to receive a hypertext transfer protocol (HTTP) message via the application layer interface, the HTTP message to comprise the configuration command.

Example 46 is the at least one computer-readable storage medium of any of Examples 42 to 45, the packet-switched network interface to comprise an Ethernet interface.

Example 47 is the at least one computer-readable storage medium of Example 46, the packet-switched network interface to comprise a reduced gigabit media-independent interface (RGMII).

Example 48 is the at least one computer-readable storage medium of any of Examples 42 to 47, the optical circuit-switched network interface to comprise a host fabric interface (HFI).

Example 49 is the at least one computer-readable storage medium of any of Examples 42 to 48, storing instructions that, when executed by processing circuitry of the compute sled, cause the out-of-band management agent to pass control of the optical circuit-switched network interface to an in-band management agent based on a determination to permit in-band configuration of the optical circuit-switched network interface.

Example 50 is the at least one computer-readable storage medium of any of Examples 42 to 49, the compute sled to comprise an M.2 boot module.

Example 51 is a method, comprising deconstructing, by control circuitry, a packet received via an out-of-band management network, identifying a configuration command comprised in the received packet, and controlling an optical circuit-switched network interface based on the configuration command.

Example 52 is the method of Example 51, comprising receiving the configuration command by accessing an application layer interface.

Example 53 is the method of Example 52, the application layer interface to comprise a Redfish interface.

Example 54 is the method of any of Examples 52 to 53, comprising receiving a hypertext transfer protocol (HTTP) message via the application layer interface, the HTTP message to comprise the configuration command.

Example 55 is the method of any of Examples 51 to 54, the packet-switched network interface to comprise an Ethernet interface.

Example 56 is the method of Example 55, the packet-switched network interface to comprise a reduced gigabit media-independent interface (RGMII).

Example 57 is the method of any of Examples 51 to 56, the optical circuit-switched network interface to comprise a host fabric interface (HFI).

Example 58 is the method of any of Examples 51 to 57, comprising passing control of the optical circuit-switched network interface to an in-band management agent based on a determination to permit in-band configuration of the optical circuit-switched network interface.

Example 59 is a method, comprising determining, by processing circuitry of a network fabric management node, to configure an optical circuit-switched network interface of a sled, generating an interface configuration command, and sending the interface configuration command over an out-of-band management link to an out-of-band management agent for the optical circuit-switched network interface.

Example 60 is the method of Example 59, comprising sending the interface configuration command over the out-of-band management link by accessing an application layer interface.

Example 61 is the method of Example 60, the application layer interface to comprise a Redfish interface.

Example 62 is the method of any of Examples 60 to 61, comprising using the application layer interface to send a hypertext transfer protocol (HTTP) message to the out-of-band management agent, the HTTP message to comprise the interface configuration command.

Example 63 is the method of any of Examples 59 to 62, the sled to comprise a compute sled.

Example 64 is the method of any of Examples 59 to 63, the optical circuit-switched network interface to comprise a host fabric interface.

Example 65 is the method of any of Examples 59 to 64, comprising constructing a packet for transmission over a packet-switched network, the packet to comprise the interface configuration command.

Example 66 is the method of Example 65, the packet-switched network to comprise an out-of-band management network.

Example 67 is a method, comprising deconstructing, by circuitry of a compute sled, a packet received via an out-of-band management network, identifying a configuration command comprised in the received packet, and controlling the optical circuit-switched network interface based on the configuration command.

Example 68 is the method of Example 67, comprising receiving the configuration command by accessing an application layer interface.

Example 69 is the method of Example 68, the application layer interface to comprise a Redfish interface.

Example 70 is the method of any of Examples 68 to 69, comprising receiving a hypertext transfer protocol (HTTP) message via the application layer interface, the HTTP message to comprise the configuration command.

Example 71 is the method of any of Examples 67 to 70, the packet-switched network interface to comprise an Ethernet interface.

Example 72 is the method of Example 71, the packet-switched network interface to comprise a reduced gigabit media-independent interface (RGMII).

Example 73 is the method of any of Examples 67 to 72, the optical circuit-switched network interface to comprise a host fabric interface (HFI).

Example 74 is the method of any of Examples 67 to 73, comprising passing control of the optical circuit-switched network interface to an in-band management agent based on a determination to permit in-band configuration of the optical circuit-switched network interface.

Example 75 is the method of any of Examples 67 to 74, the compute sled to comprise an M.2 boot module.

Example 76 is an apparatus, comprising means for deconstructing a packet received via an out-of-band management network, means for identifying a configuration command comprised in the received packet, and means for controlling an optical circuit-switched network interface based on the configuration command.

Example 77 is the apparatus of Example 76, comprising means for receiving the configuration command by accessing an application layer interface.

Example 78 is the apparatus of Example 77, the application layer interface to comprise a Redfish interface.

Example 79 is the apparatus of any of Examples 77 to 78, comprising means for receiving a hypertext transfer protocol (HTTP) message via the application layer interface, the HTTP message to comprise the configuration command.

Example 80 is the apparatus of any of Examples 76 to 79, the packet-switched network interface to comprise an Ethernet interface.

Example 81 is the apparatus of Example 80, the packet-switched network interface to comprise a reduced gigabit media-independent interface (RGMII).

Example 82 is the apparatus of any of Examples 76 to 81, the optical circuit-switched network interface to comprise a host fabric interface (HFI).

Example 83 is the apparatus of any of Examples 76 to 82, comprising means for passing control of the optical circuit-switched network interface to an in-band management agent based on a determination to permit in-band configuration of the optical circuit-switched network interface.

Example 84 is an apparatus, comprising means for determining to configure an optical circuit-switched network interface of a sled, means for generating an interface configuration command, and means for sending the interface configuration command over an out-of-band management link to an out-of-band management agent for the optical circuit-switched network interface.

Example 85 is the apparatus of Example 84, comprising means for sending the interface configuration command over the out-of-band management link by accessing an application layer interface.

Example 86 is the apparatus of Example 85, the application layer interface to comprise a Redfish interface.

Example 87 is the apparatus of any of Examples 85 to 86, comprising means for using the application layer interface to send a hypertext transfer protocol (HTTP) message to the out-of-band management agent, the HTTP message to comprise the interface configuration command.

Example 88 is the apparatus of any of Examples 84 to 87, the sled to comprise a compute sled.

Example 89 is the apparatus of any of Examples 84 to 88, the optical circuit-switched network interface to comprise a host fabric interface.

Example 90 is the apparatus of any of Examples 84 to 89, comprising means for constructing a packet for transmission over a packet-switched network, the packet to comprise the interface configuration command.

Example 91 is the apparatus of Example 90, the packet-switched network to comprise an out-of-band management network.

Example 92 is a compute sled, comprising means for deconstructing a packet received via an out-of-band management network, means for identifying a configuration command comprised in the received packet, and means for controlling the optical circuit-switched network interface based on the configuration command.

Example 93 is the compute sled of Example 92, comprising means for receiving the configuration command by accessing an application layer interface.

Example 94 is the compute sled of Example 93, the application layer interface to comprise a Redfish interface.

Example 95 is the compute sled of any of Examples 93 to 94, comprising means for receiving a hypertext transfer protocol (HTTP) message via the application layer interface, the HTTP message to comprise the configuration command.

Example 96 is the compute sled of any of Examples 92 to 95, the packet-switched network interface to comprise an Ethernet interface.

Example 97 is the compute sled of Example 96, the packet-switched network interface to comprise a reduced gigabit media-independent interface (RGMII).

Example 98 is the compute sled of any of Examples 92 to 97, the optical circuit-switched network interface to comprise a host fabric interface (HFI).

Example 99 is the compute sled of any of Examples 92 to 98, comprising means for passing control of the optical circuit-switched network interface to an in-band management agent based on a determination to permit in-band configuration of the optical circuit-switched network interface.

Example 100 is the compute sled of any of Examples 92 to 99, comprising an M.2 boot module.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
    a packet-switched network interface to deconstruct a packet received via an out-of-band management network; and
    control circuitry to execute an out-of-band management agent, the out-of-band management agent to:
        identify a configuration command comprised in the received packet;
        control an optical circuit-switched network interface based on the configuration command; and
        pass control of the optical circuit-switched network interface to an in-band management agent based on a determination to permit in-band configuration of the optical circuit-switched network interface.

2. The apparatus of claim 1, wherein the out-of-band management agent to receive the configuration command by accessing an application layer interface.

3. The apparatus of claim 2, wherein the application layer interface to comprise a Redfish interface.

4. The apparatus of claim 2, wherein the out-of-band management agent to receive a hypertext transfer protocol (HTTP) message via the application layer interface, wherein the HTTP message to comprise the configuration command.

5. The apparatus of claim 1, wherein the packet-switched network interface to comprise an Ethernet interface.

6. The apparatus of claim 5, wherein the packet-switched network interface to comprise a reduced gigabit media-independent interface (RGMII).

7. The apparatus of claim 1, wherein the optical circuit-switched network interface to comprise a host fabric interface (HFI).

8. A compute sled, comprising:
    one or more processors;
    an optical circuit-switched network interface; and
    a packet-switched network interface to deconstruct a packet received via an out-of-band management network; and
    control circuitry to execute an out-of-band management agent, the out-of-band management agent to:
        identify a configuration command comprised in the received packet;
        control the optical circuit-switched network interface based on the configuration command; and
        pass control of the optical circuit-switched network interface to an in-band management agent based on a determination to permit in-band configuration of the optical circuit-switched network interface.

9. The compute sled of claim 8, wherein the out-of-band management agent to receive the configuration command by accessing an application layer interface.

10. The compute sled of claim 9, wherein the application layer interface to comprise a Redfish interface.

11. The compute sled of claim 9, wherein the out-of-band management agent to receive a hypertext transfer protocol (HTTP) message via the application layer interface, wherein the HTTP message to comprise the configuration command.

12. The compute sled of claim 8, wherein the packet-switched network interface to comprise an Ethernet interface.

13. The compute sled of claim 12, wherein the packet-switched network interface to comprise a reduced gigabit media-independent interface (RGMII).

14. The compute sled of claim 8, wherein the optical circuit-switched network interface to comprise a host fabric interface (HFI).

15. The compute sled of claim 8, comprising an M.2 boot module.

* * * * *